United States Patent
Yanai et al.

(10) Patent No.: US 11,094,232 B2
(45) Date of Patent: Aug. 17, 2021

(54) DISPLAY SET AND DISPLAY METHOD

(71) Applicant: CANON KABUSHIKI KAISHA, Tokyo (JP)

(72) Inventors: Yumi Yanai, Yokohama (JP); Shinichi Miyazaki, Kawasaki (JP); Yuji Akiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/224,987

(22) Filed: Dec. 19, 2018

(65) Prior Publication Data
US 2019/0122594 A1 Apr. 25, 2019

Related U.S. Application Data

(63) Continuation of application No. 15/219,379, filed on Jul. 26, 2016, now Pat. No. 10,198,976.

(30) Foreign Application Priority Data

Jul. 31, 2015 (JP) .................................. 2015-152778
Jul. 31, 2015 (JP) .................................. 2015-152886

(Continued)

(51) Int. Cl.
*G09F 19/14* (2006.01)
*G02B 27/02* (2006.01)
*G09F 19/22* (2006.01)

(52) U.S. Cl.
CPC ............ *G09F 19/14* (2013.01); *G02B 27/022* (2013.01); *G09F 19/22* (2013.01); *G09F 19/228* (2013.01)

(58) Field of Classification Search
CPC .......... G09F 9/14; G09F 19/22; G09F 19/228; G02B 27/022
See application file for complete search history.

(56) References Cited

U.S. PATENT DOCUMENTS 1,607,922 A * 11/1926 Schweitzer ............. F21V 33/00
362/125
2,783,730 A * 3/1957 Robins .................... E01F 9/619
116/63 R (Continued)

FOREIGN PATENT DOCUMENTS

JP S39-014896 Y 6/1964
JP S39-027620 Y 9/1964

(Continued)

OTHER PUBLICATIONS

Jan. 14, 2020 Japanese Official Action in Japanese Patent Appln. No. 2015-152778.

(Continued)

*Primary Examiner* — Gary C Hoge
(74) *Attorney, Agent, or Firm* — Venable LLP

(57) ABSTRACT

In a viewing object display set, it is possible to prevent a reduction in a sense of reality when a viewing object is seen. Specifically, the display set for viewing the viewing object includes the viewing object that is attached to a display surface and an object for visual effect that is provided on a viewing position side with respect to the viewing object and shields at least a portion of the viewing object. The object for visual effect is arranged so as to shield the boundary between the viewing object and the display surface.

23 Claims, 27 Drawing Sheets

(30) Foreign Application Priority Data

| Jul. 31, 2015 | (JP) | 2015-152926 |
| Jul. 31, 2015 | (JP) | 2015-152933 |
| Jul. 31, 2015 | (JP) | 2015-152936 |

(56) References Cited

U.S. PATENT DOCUMENTS

| 5,265,360 | A | * | 11/1993 | Reiss | A47G 1/0616 |
| | | | | | 362/125 |
| 5,743,038 | A | * | 4/1998 | Soto | A47G 1/0616 |
| | | | | | 40/219 |
| 6,564,486 | B1 | * | 5/2003 | Spodek | G02B 27/06 |
| | | | | | 40/453 |
| 6,574,010 | B1 | | 6/2003 | Ohnuma et al. | |
| 6,693,731 | B1 | | 2/2004 | Ohnuma et al. | |
| 6,918,199 | B1 | * | 7/2005 | Preta | G09F 19/22 |
| | | | | | 40/427 |
| 7,006,668 | B2 | | 2/2006 | Iguchi et al. | |
| 7,167,205 | B2 | | 1/2007 | Akiyama et al. | |
| 7,369,163 | B2 | | 5/2008 | Akiyama et al. | |
| 7,639,390 | B2 | | 12/2009 | Yamada et al. | |
| 7,738,030 | B2 | | 6/2010 | Akiyama et al. | |
| 9,202,284 | B2 | | 12/2015 | Akiyama et al. | |
| 9,769,352 | B2 | | 9/2017 | Yanai et al. | |
| 9,804,405 | B2 | | 10/2017 | Yanagisawa et al. | |
| 2002/0095843 | A1 | * | 7/2002 | Edmunds | G09F 19/14 |
| | | | | | 40/624 |
| 2003/0101628 | A1 | * | 6/2003 | Gort | G09F 19/14 |
| | | | | | 40/453 |
| 2003/0115784 | A1 | * | 6/2003 | Thomsen | G09F 19/22 |
| | | | | | 40/596 |
| 2004/0035030 | A1 | * | 2/2004 | Sondergaard | G09F 19/18 |
| | | | | | 40/453 |
| 2004/0239582 | A1 | * | 12/2004 | Seymour | G06T 11/60 |
| | | | | | 345/5 |
| 2006/0117622 | A1 | * | 6/2006 | Sondergaard | G09F 19/22 |
| | | | | | 40/596 |
| 2009/0059303 | A1 | | 3/2009 | Miyazaki | |
| 2009/0071050 | A1 | * | 3/2009 | Hines | G09F 19/22 |
| | | | | | 40/564 |
| 2009/0168164 | A1 | * | 7/2009 | Kean | H04N 13/324 |
| | | | | | 359/463 |
| 2012/0026289 | A1 | | 2/2012 | Suenaga et al. | |
| 2014/0002351 | A1 | * | 1/2014 | Nakayama | H04N 21/44218 |
| | | | | | 345/156 |
| 2014/0177047 | A1 | * | 6/2014 | Jiang | G02B 30/27 |
| | | | | | 359/464 |
| 2015/0146352 | A1 | | 5/2015 | Yanagisawa et al. | |
| 2016/0307475 | A1 | * | 10/2016 | Yin | G09F 19/14 |
| 2016/0371866 | A1 | * | 12/2016 | Ng | H04N 13/324 |
| 2017/0006185 | A1 | | 1/2017 | Yanai et al. | |
| 2017/0309208 | A1 | * | 10/2017 | Yin | G09F 19/02 |

FOREIGN PATENT DOCUMENTS

| JP | S42-000145 | Y | 1/1967 |
| JP | S43-010036 | B | 5/1968 |
| JP | S61-036465 | A | 2/1986 |
| JP | H10-340061 | A | 12/1998 |
| JP | 3060342 | U | 6/1999 |
| JP | 2008-006813 | A | 1/2008 |
| JP | 2008-297803 | A | 12/2008 |
| JP | 2010-238108 | A | 10/2010 |
| JP | 2015-127799 | A | 7/2015 |
| JP | 2017-032801 | A | 2/2017 |
| JP | 2017-032803 | A | 2/2017 |

OTHER PUBLICATIONS

Jan. 14, 2020 Japanese Official Action in Japanese Patent Appln. No. 2015-152933.

Jan. 7, 2020 Japanese Official Action in Japanese Patent Appln. No. 2015-152936.

Jan. 7, 2020 Japanese Official Action in Japanese Patent Appln. No. 2015-152886.

Jan. 7, 2020 Japanese Official Action in Japanese Patent Appln. No. 2015-152926.

May 28, 2019 Japanese Official Action in Japanese Patent Appln. No. 2015-152936.

Jun. 4, 2019 Japanese Official Action in Japanese Patent Appln. No. 2015-152778.

Jun. 4, 2019 Japanese Official Action in Japanese Patent Appln. No. 2015-152933.

May 28, 2019 Japanese Official Action in Japanese Patent Appln. No. 2015-152926.

\* cited by examiner

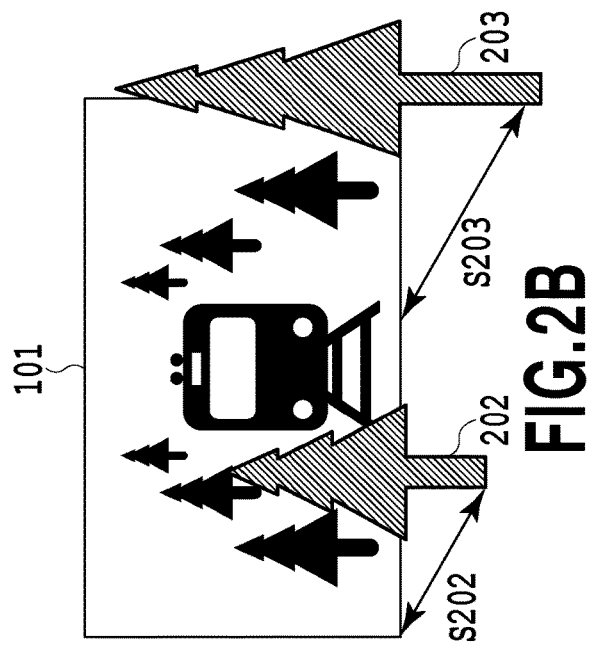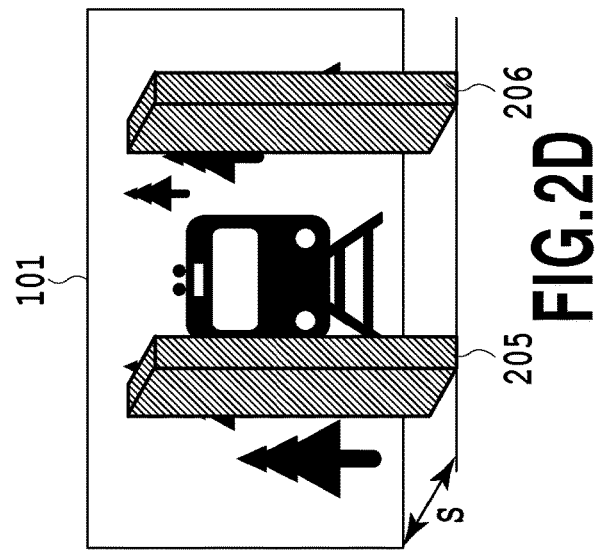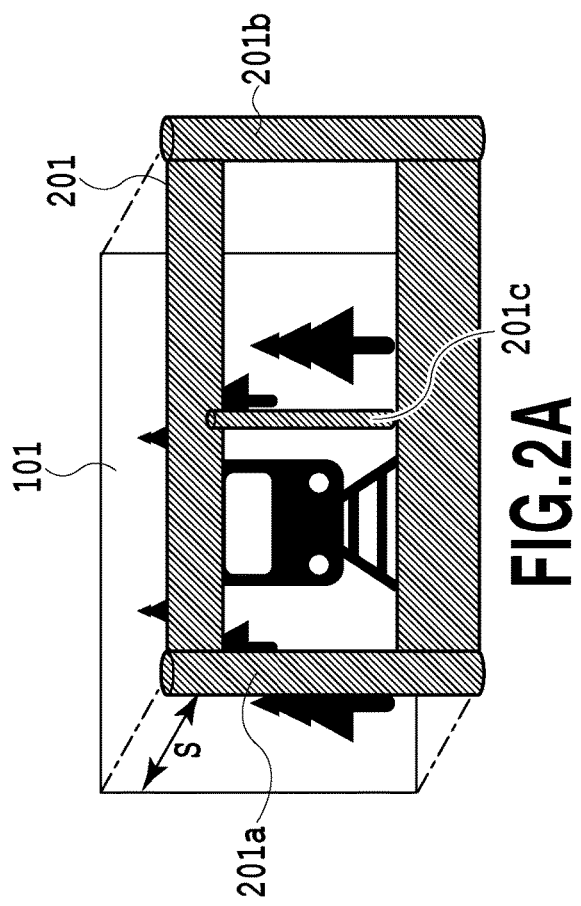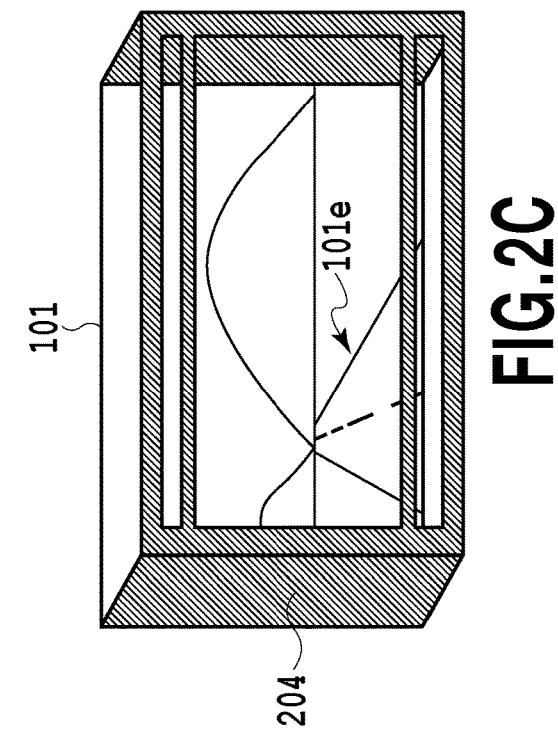

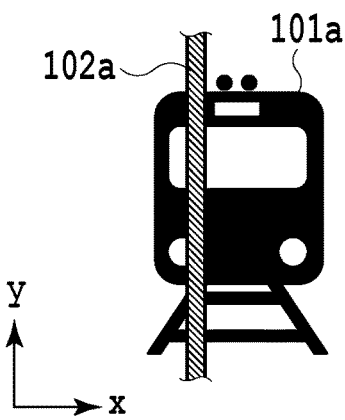
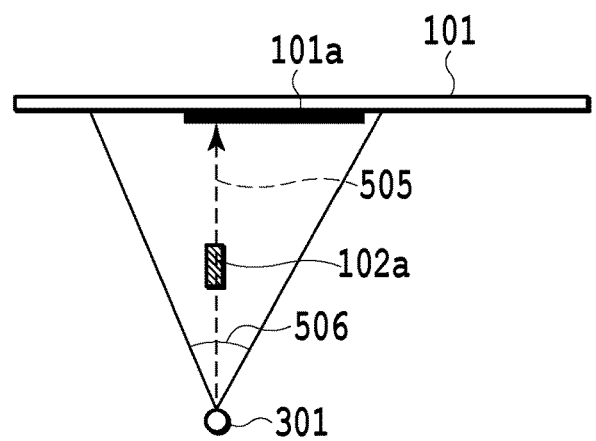
FIG.4A  FIG.4B
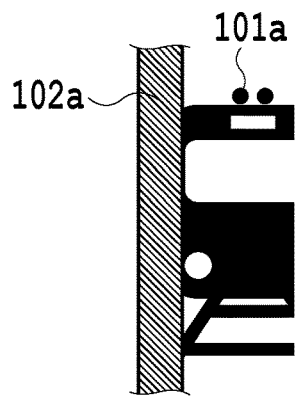
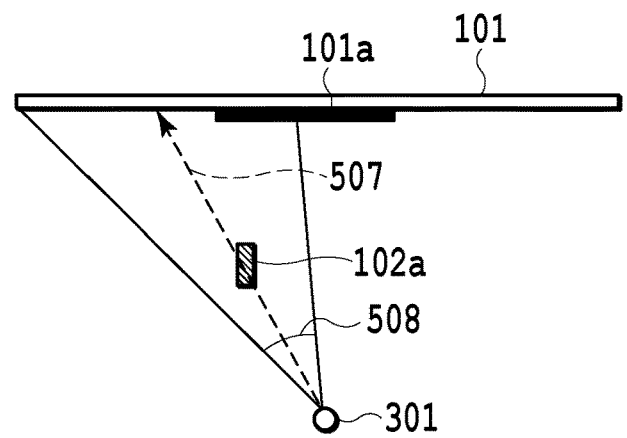
FIG.4C  FIG.4D
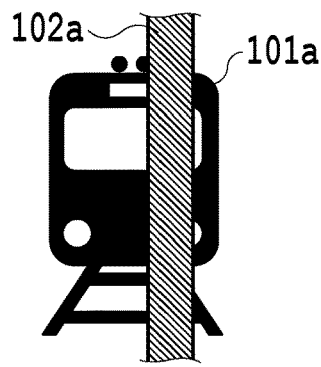
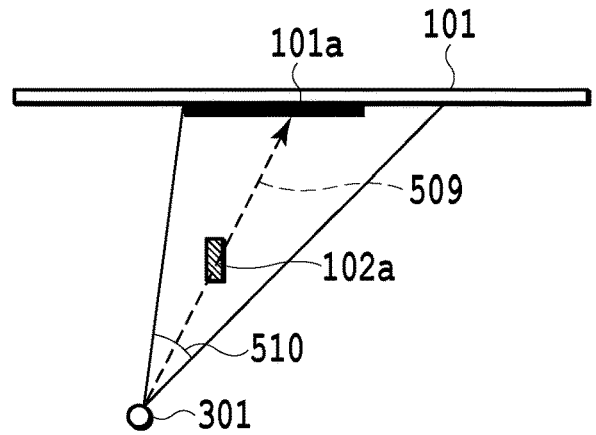
FIG.4E  FIG.4F

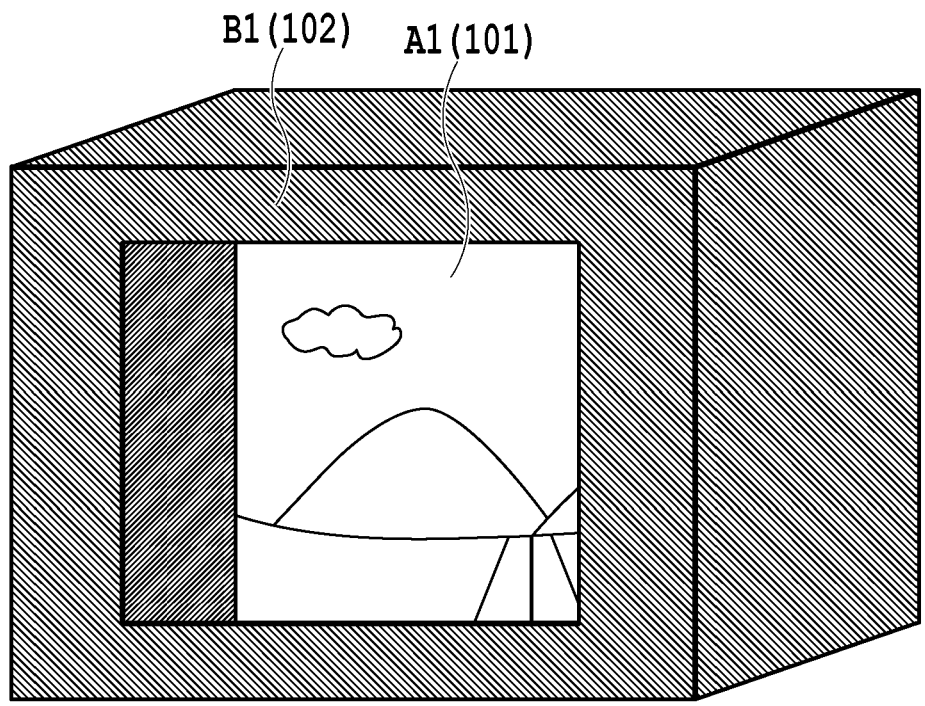
FIG.9

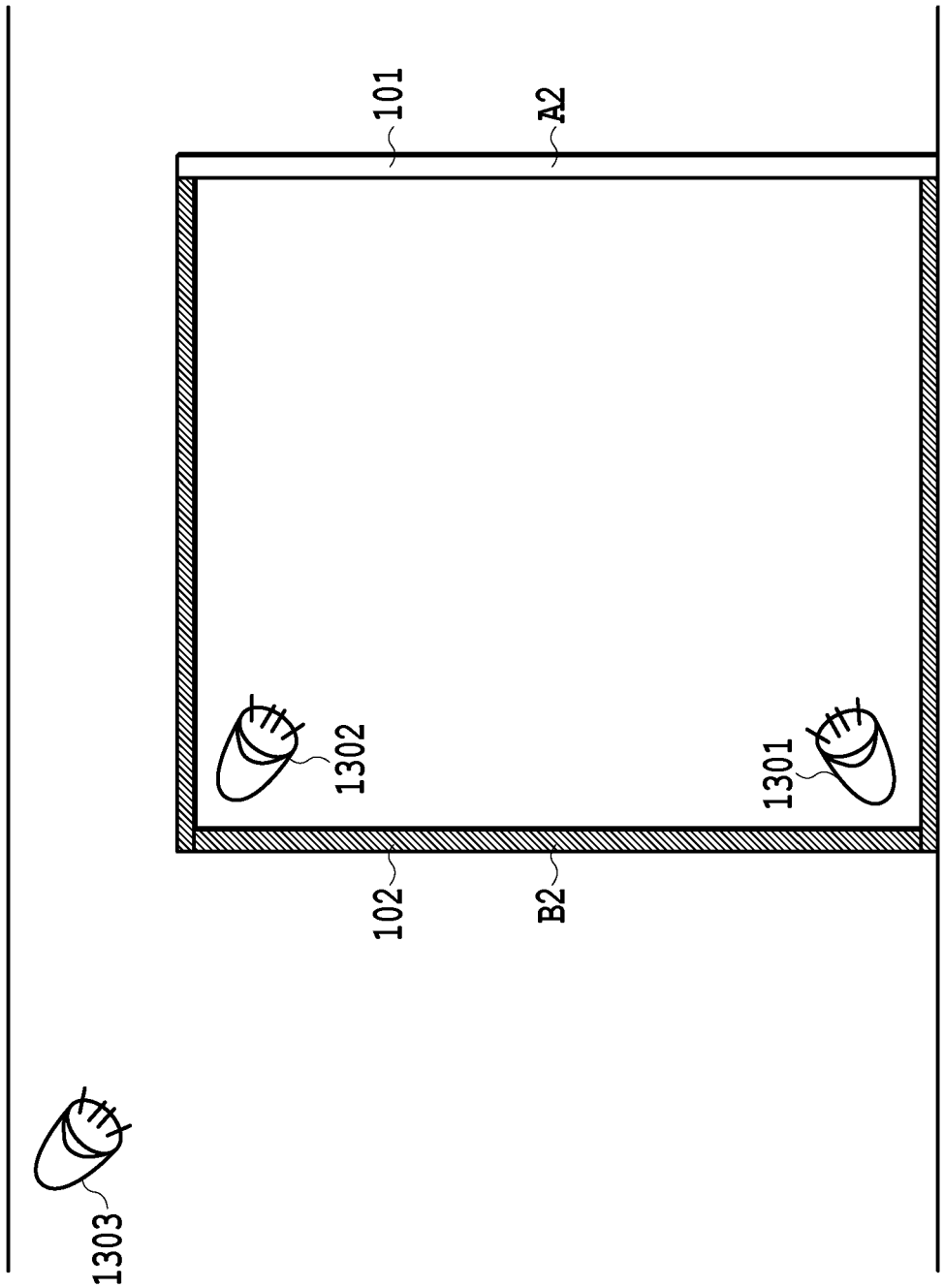

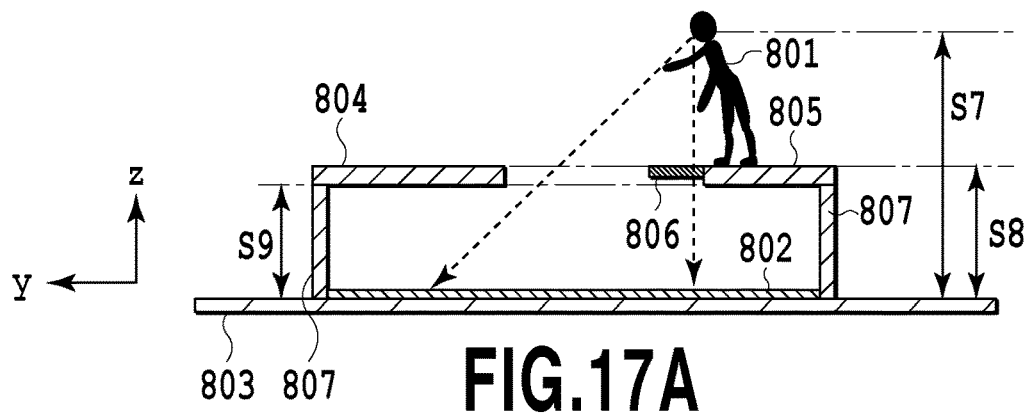
FIG.17A
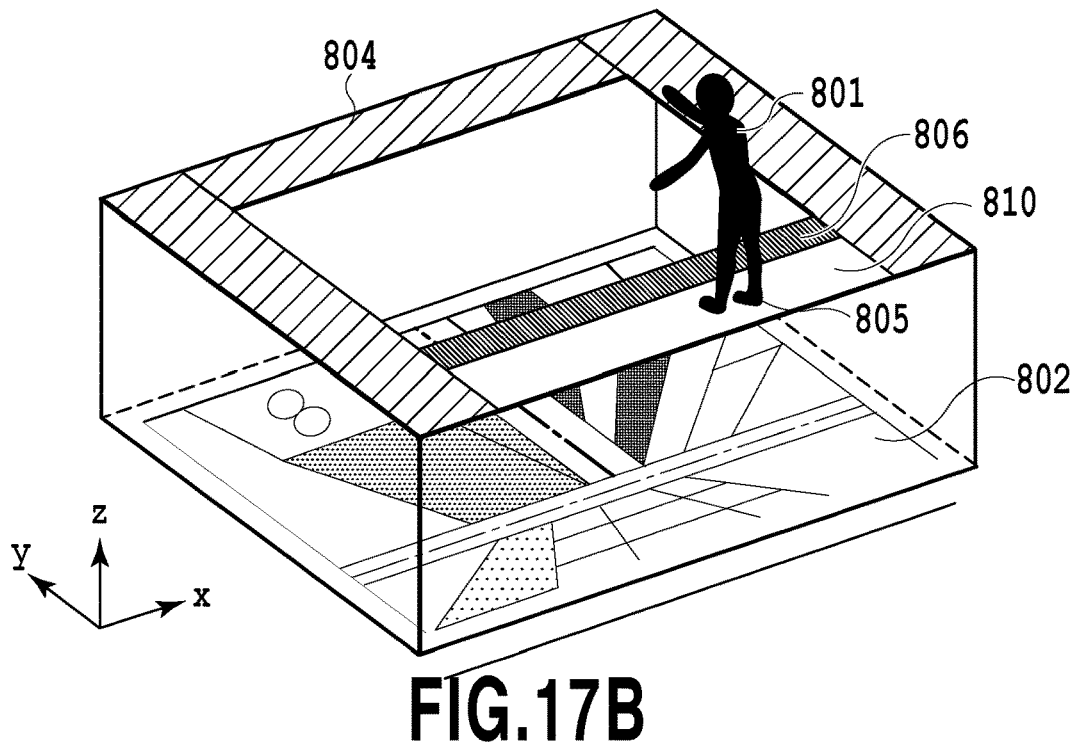
FIG.17B
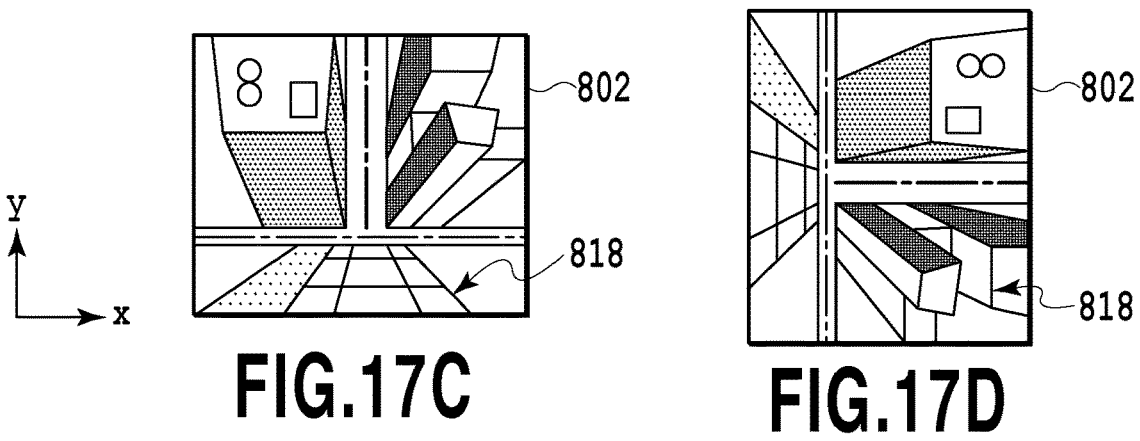
FIG.17C
FIG.17D

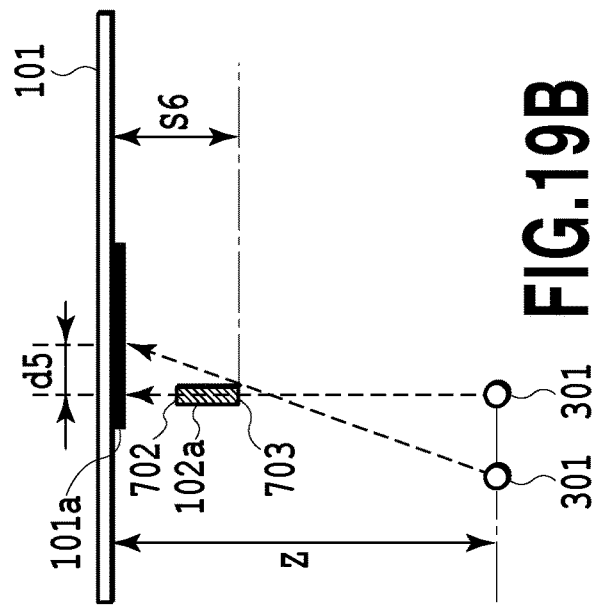
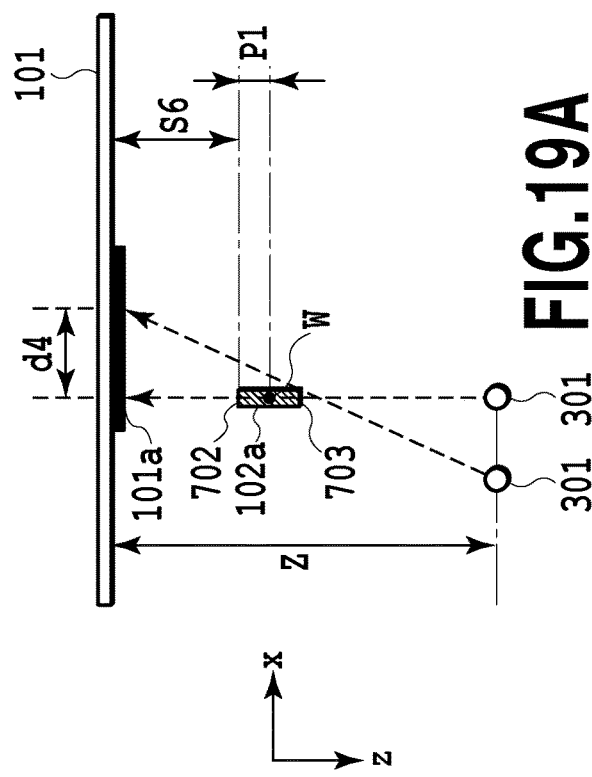
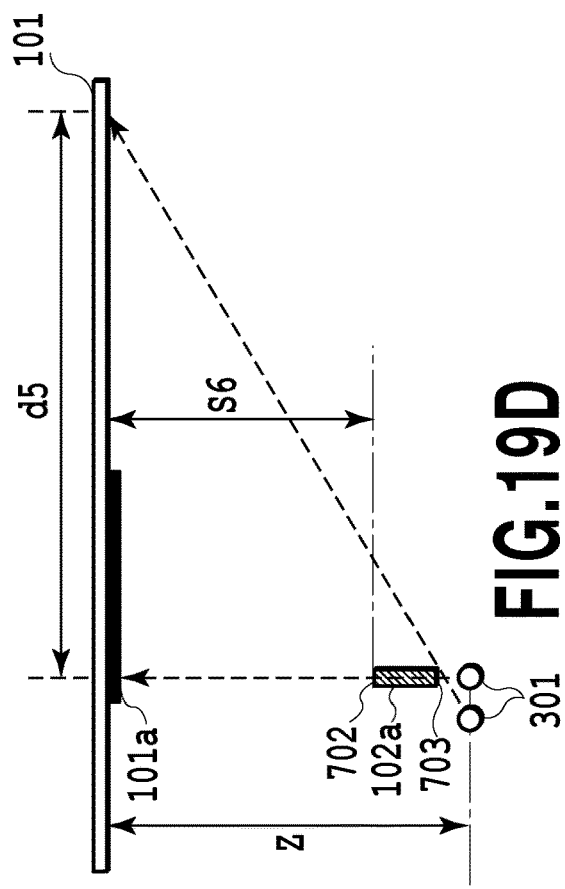

DISPLAY SET AND DISPLAY METHOD

BACKGROUND OF THE INVENTION

This application is a continuation of application Ser. No. 15/219,379 filed Jul. 26, 2016.

Field of the Invention

The present invention relates to a display set and a display method, and more particularly, to a display set and a display method for displaying a viewing object such as a printed matter or a picture.

Description of the Related Art

As an example of a display set, Japanese Patent Laid-Open No. 2008-297803 discloses a pseudo window. The pseudo window is installed in an environment in which it is difficult to install a window in order to keep silence in, for example, a meeting room or to prevent the leak of a secret. In the pseudo window, an image of scenery which is likely to be present outside the window is displayed on a display portion and a pseudo window frame is provided at the front of the display portion. This pseudo window allows persons in a room to have simulated experience such that the persons feel as if they see real scenery.

However, in the pseudo window disclosed in Japanese Patent Laid-Open No. 2008-297803, when the viewer sees the displayed image of scenery outside the window, "a sense of reality" is likely to be poor. It is difficult to provide a good sense of reality just by arranging the window and there is possibility not to obtain the sufficient effect of simulated experience. The reason is that, in order to effectively produce "a sense of reality" of a viewing object, such as a sense of three-dimension or a sense of immersion, it is important to appropriately set and control the positional relationship among a viewer, a viewing object, and an object for visual effect object for visual effect which is used to create a display environment in a display set. In Japanese Patent Laid-Open No. 2008-297803, it is difficult to control the relationship between the window as the object for visual effect, the viewing object, and the viewer and the positional relationship is broken by the opening and closing of the object for visual effect (the window). As a result, there is possibility to reduce a sense of reality.

SUMMARY OF THE INVENTION

An object of the invention is to provide a viewing object display set and a display method which can prevent a reduction in a sense of reality when a viewing object is seen.

In a first aspect of the present invention, there is provided a display set for viewing a viewing object, comprising: the viewing object; and an object for visual effect that is arranged on a viewing position side with respect to the viewing object and shields at least a portion of the viewing object, wherein a relative position between the viewing object and the object for visual effect is determined based on a distance of a viewer who sees the viewing object from the viewing object, and the viewing object and the object for visual effect are respectively fixed so that the relative position between the viewing object and the object for visual effect does not change.

In a second aspect of the present invention, there is provided a display method for viewing a viewing object, comprising: a step of arranging the viewing object attached to a display surface and an object for visual effect that is arranged on a viewing position side with respect to the viewing object and shields at least a portion of the viewing object, wherein a relative position between the viewing object and the object for visual effect is determined based on a distance of a viewer who sees the viewing object from the viewing object, and the viewing object and the object for visual effect are respectively fixed so that the relative position between the viewing object and the object for visual effect does not change.

According to the above-mentioned configuration, it is possible to prevent a reduction in a sense of reality when a viewing object is seen.

Further features of the present invention will become apparent from the following description of exemplary embodiments (with reference to the attached drawings).

BRIEF DESCRIPTION OF THE DRAWINGS

FIGS. 2A to 2D are perspective views illustrating other examples of an object for visual effect;

FIGS. 4A to 4F are diagrams illustrating motion parallax according to this embodiment;

FIG. 9 is a diagram illustrating viewing regions of a viewing object and an object for visual effect according to an embodiment of the invention;

FIG. 15 is a diagram illustrating the illumination of the viewing object and the object for visual effect in the modification example of the second embodiment;

FIGS. 17A to 17D are diagrams illustrating a display set according to a modification example of the third embodiment of the invention;

FIGS. 19A to 19D are diagrams illustrating the control of the distance to an object for visual effect in a fourth embodiment of the invention;

DESCRIPTION OF THE EMBODIMENTS

Hereinafter, embodiments of the present invention will be described in detail with reference to the drawings. In the following embodiments, components are illustrative and the scope of the invention is not limited to only the components.

First Embodiment

Figure 1A:
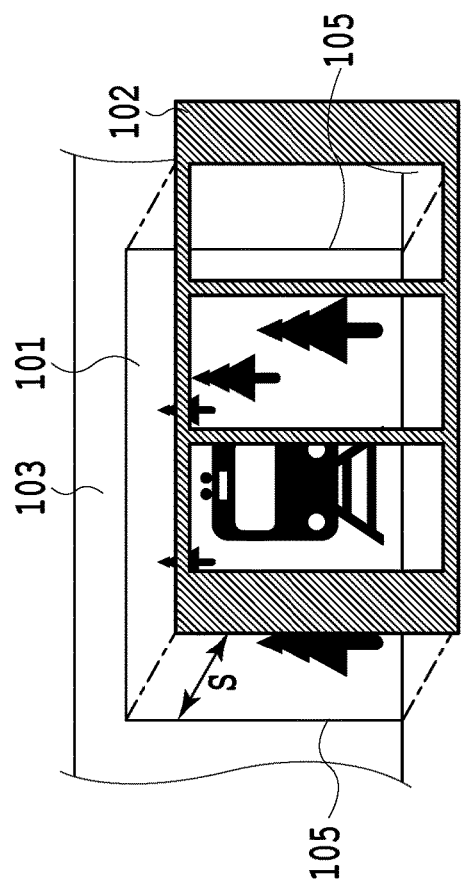
FIGS. 1A to 1D are diagrams illustrating a display set according to a first embodiment of the invention.

FIGS. 1A to 1D are diagrams illustrating a display set according to an embodiment of the invention. In the drawings, reference numeral 101 denotes a viewing object. The viewing object can be a sheet or a panel on which an image is printed by an inkjet printer or a picture is drawn. The viewing object 101 is fixed to a display surface 103 such as a wall. The viewing object may be, for example, an image which is directly printed or drawn on the display surface. In addition, reference numeral 102 denotes an object for visual effect, is provided on a viewing position side with respect to the viewing object, and is formed by attaching a uniform color sheet on the surface of a wood board. The object for visual effect is not limited to this form. For example, a plate obtained by performing a coating process on the wood board, a color plastic plate, or a metal plate may be used. As illustrated in FIG. 1A, the material 102 for visual effect is provided at a relative position that is a distance S away from the viewing object 101. The distance can be determined on the basis of the size of the viewing object 101 such that, particularly, a boundary 105 between the viewing object 101 and the display surface 103 in the horizontal direction is not visually recognized, which will be described in detail later. The term "boundary" includes the boundary between a blank and an image when there is the blank around the image on the viewing object 101, as in a picture.

Figure 1B:
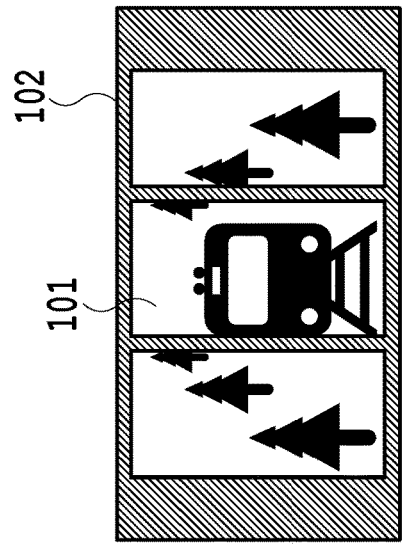
Figure 1C:
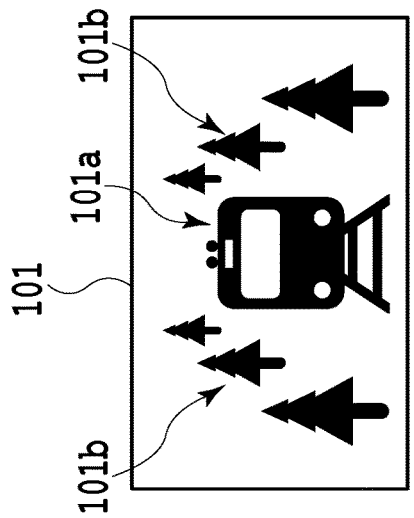
Figure 1D:
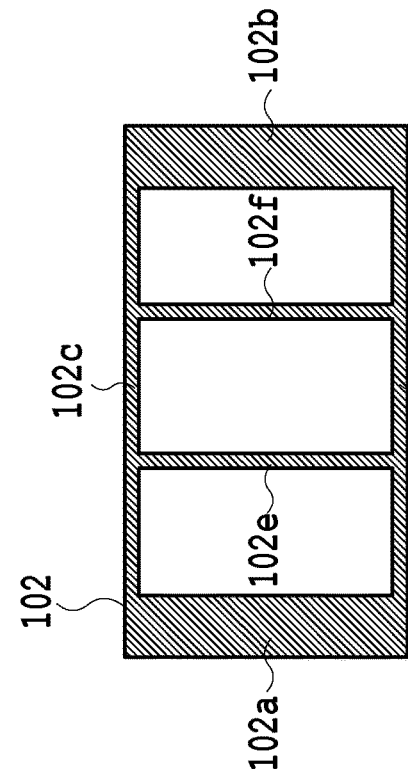

FIG. 1B is a front view illustrating the display set according to this embodiment, in which the display surface is omitted. FIG. 1C is a front view illustrating the viewing object and FIG. 1D is a front view illustrating the material 102 for visual effect. As illustrated in FIG. 1C, the viewing object 101 includes viewing target images 101a and 101b. The viewing target images 101a and 101b are objects to which a viewer is likely to particularly pay attention when the viewer sees the viewing object. In the example illustrated in FIG. 1D, the material 102 for visual effect has a frame shape, such as a predetermined window frame, but is not limited thereto. The object for visual effect shields a portion of the viewing object so as to cause the viewer not to see the portion of the viewing object, which will be described in detail later, and gives the effect of "motion parallax" by the movement of the viewer or a "sense of depth". The material 102 for visual effect which has a frame shape illustrated in FIG. 1D includes vertical materials 102a, 102b, 102e, and 102f for visual effect and horizontal materials 102c and 102d for visual effect. Spaces for viewing the viewing object are provided between four vertical materials for visual effect. The object for visual effect according to this embodiment is fixed between the viewing object and the viewer. The use of the object for visual effect makes it possible to produce "a sense of reality", such as a sense of three-dimension, a sense of depth, or a sense of immersion, in the viewing object, which will be described in detail later. In this embodiment, in order to sufficiently obtain the effect, an appropriate positional relationship among the object for visual effect, the viewing object, and the viewer is controlled. Therefore, it is preferable that the object for visual effect be fixed at an appropriate position in order to easily obtain the effect. For example, in some cases, when the shape or position of the object for visual effect is changed while the viewer sees the viewing object, for example, a sense of depth is reduced, which results in a reduction in a sense of reality of the display set. Here, the object for visual effect can be fixed by, for example, an adhesive or a jig. Alternatively, the object for visual effect may be provided at a desired position on a floor and may be displayed such that the position thereof is maintained. The viewer may be warned not to move the object for visual effect. In addition, the object for visual effect may be placed horizontally in a condition that the viewer does not consider that the object for visual effect is movable and does not move the object for visual effect. It is preferable that the object for visual effect be fixed. Therefore, in the actual environment, the object for visual effect is maintained stationary rather than being movable. For example, it is considered that, when an object for visual effect having an animal shape is maintained stationary, a sense of incongruity is likely to occur. Therefore, it is preferable that the object for visual effect according to this embodiment be maintained stationary in the actual environment.

FIGS. 2A to 2D are perspective views illustrating other examples of the object for visual effect and are the same as FIG. 1A. In the drawings, the display surface 103 is not illustrated.

A material 201 for visual effect illustrated in FIG. 2A includes three vertical materials 201a, 201b, and 201c for visual effect. The vertical materials 201a and 201b for visual effect which have a cylindrical shape are provided at both ends of the material 201 for visual effect and the vertical material 201c for visual effect which has a cylindrical shape and is thinner than the vertical materials 201a and 201b for visual effect provided at both ends is provided at the center of the material 201 for visual effect. an object for visual effect illustrated in FIG. 2D includes two vertical materials 205 and 206 for visual effect which have a prism shape and are fixed between the center and the left and right ends of the viewing object 101. The vertical materials 205 and 206 for visual effect are separated from the viewing object at predetermined intervals. The distance from the surfaces of the two prism-shaped vertical materials 205 and 206 for visual effect which are closest to the viewer to the viewing object 101 is S. An object for visual effect illustrated in FIG. 2B includes two tree-shaped vertical materials 202 and 203 for visual effect. A material 204 for visual effect illustrated in FIG. 2C has a box shape (without the upper and lower materials for visual effect in the vertical direction) in which materials for visual effect are provided in depth portions on both sides of the object for visual effect in the horizontal direction. In FIGS. 2A to 2D, the viewing object is provided on a flat display surface. However, the shape of the viewing object is not limited thereto. For example, the viewing object may be provided in a cylinder or on a dome-shaped surface so as to surround the viewer. In this case, the object for visual effect according to this embodiment is provided so as to be fixed between the viewer and the viewing object.

As described above, the object for visual effect according to the embodiment of the invention includes at least vertical materials for visual effect and, for example, the arrangement of the vertical materials for visual effect can be set such that the vertical materials for visual effect shield a portion of the viewing object and the viewer does not see the boundary between the viewing object and the display surface.

Figure 3:
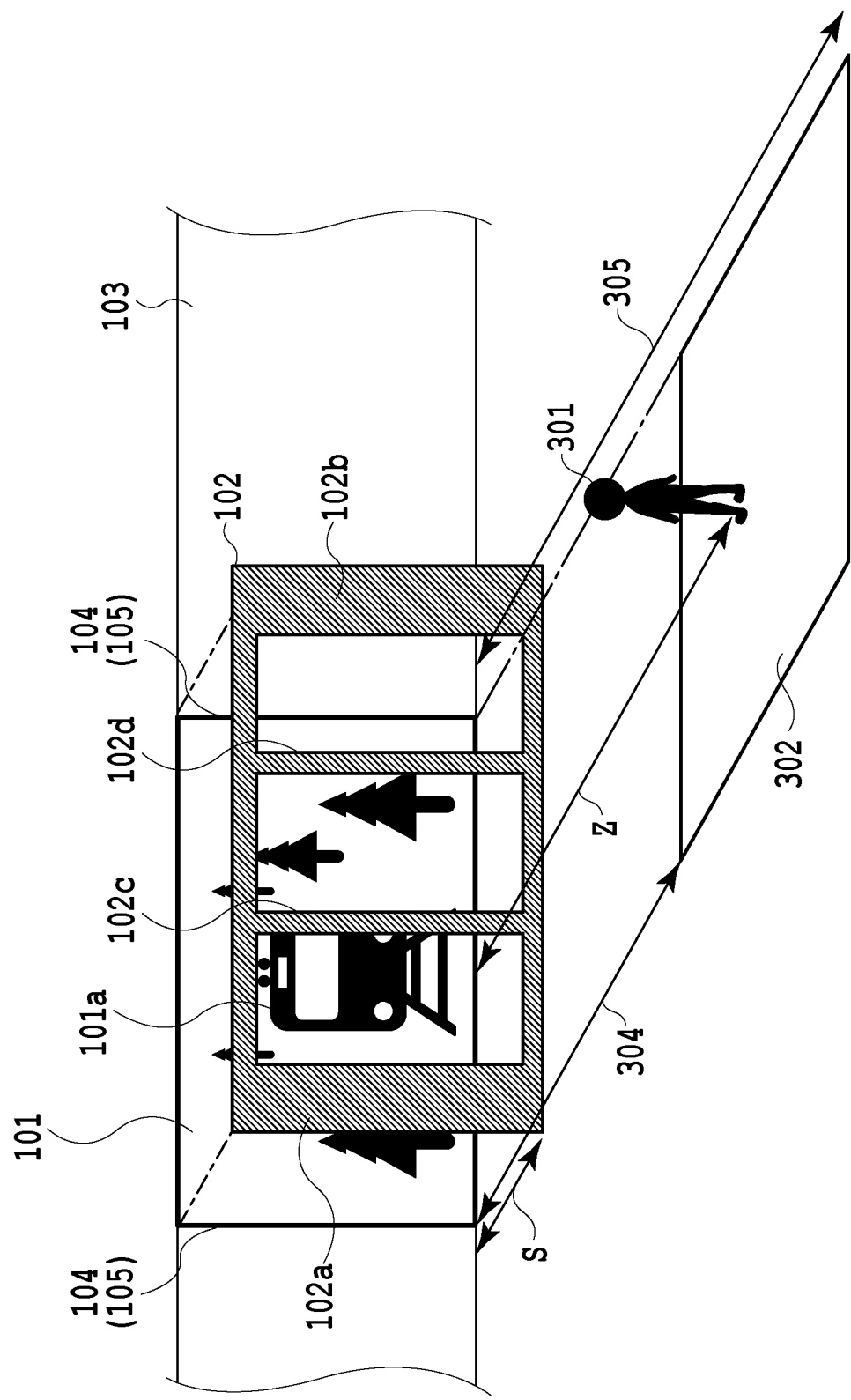
FIG. 3 is a diagram particularly illustrating the relationship between a viewing object and the object for visual effect and the relationship between a viewer who sees the viewing object and a viewing target image of the viewing object in a display set according to an embodiment.

FIG. 3 is a diagram particularly illustrating the relationship between the viewing object 101 and the material 102 for visual effect and the relationship between a viewer 301 who sees the viewing object and the viewing target image 101a of the viewing object in the display set according to this embodiment. FIG. 3 is the same as FIG. 1A.

When the viewer 301 (at a distance Z from the viewing object) sees the viewing object 101, first, a focus adjustment function of the human eye is considered. That is, there is a difference in capability to recognize depth using the focus adjustment function of the human eye between individuals. In general, the depth which can be recognized by the focus adjustment function of the human eye is 2 meters. When the viewer sees the viewing object at a distance less than the distance of 2 meters, the viewing object 101 is recognized to be present in the plane by the focus adjustment function and a sense of depth is not obtained. For this reason, in a recommended viewing range 302 of the viewer, the shortest distance 304 from the viewing object 101 is 2 meters or more. On the other hand, the longest distance 305 between the viewing object and the viewer is determined as follows. When the viewer gazes at the center of the viewing target image 101a in the viewing object 101, the longest distance is equal to or less than a distance at which the ends 104 (the boundaries 105 between the display surface 103 and the viewing object 101) of the viewing object 101 in the horizontal direction are within the range of the field of view of the viewer 301 in the horizontal direction. More specifically, there is a difference in the field of view of the human eye between individuals and the field of view of both eyes is generally about 120 degrees. At a distance more than the longest distance, the entire viewing object is within the field of view of the viewer and the viewer feels that the viewing object is a planar object, such as a printed matter, and a sense of reality is damaged.

In this case, when the distance is set such that the boundary is within the range of the field of view of the viewer in the horizontal direction, there is a concern that a sense of reality will be damaged, as described above. For this reason, in this embodiment, the vertical materials for visual effect (for example, 102a and 102b) of the material 102 for visual effect prevent the boundary 105 from being within the field of view of the viewer. Specifically, the size and position of the vertical materials for visual effect of the material 102 for visual effect in the horizontal direction are appropriately determined. In this way, when the viewer 301 moves in the recommended viewing range 302 while gazing at, particularly, the viewing target image (for example, 101a) of the viewing object 101, the boundary 105 can be prevented from being within the field of view of the viewer. In Japanese Patent Laid-Open No. 2008-297803, when the viewer who sees the pseudo window sees the boundary between a display portion on which an image of scenery is displayed and a window frame on which the display portion is provided, the viewer feels the planarity of the display portion, the sense of reality may be reduced. In particular, when the viewer sees the viewing object during moving, the viewer is likely to see the boundary.

Here, for example, when the arrangement of one material 102 for visual effect with respect to the viewing object 101 with a certain size in the horizontal direction illustrated in FIGS. 1A to 1D and FIGS. 2A to 2D is considered, the distance S between the viewing object 101 and the material 102 for visual effect can be determined in association with the above described conditions of the field of view in the horizontal direction. More specifically, the distance at which the boundary 105 between the viewing object 101 and the display surface 103 in the horizontal direction is within the range of the field of view of the viewer 301 in the horizontal direction is determined according to the range of the field of view of the human eye, 120 degrees, in correspondence with the shortest distance 304. When the viewing object 101 that has a certain size in the horizontal direction is seen through the material 102 for visual effect with a certain arrangement or size under the above-mentioned conditions, the distance S can be determined such that the boundary 105 is not within the range of the field of view. In this way, the distance S can be adjusted within the entire recommended viewing range to determine the appropriate range of the distance S.

Further, the material 102 for visual effect according to the embodiment of the invention is provided in order to give the effect of "a sense of reality", such as a sense of three-dimension or a sense of immersion at the time of seeing the viewing object 101. The functions of the material 102 for visual effect are (1) a function of motion parallax and (2) shielding, a relative size, and density.

The "motion parallax" is parallax that is generated due to the movement of the point of view of the viewer or the viewing target image (viewing object). In a case in which the object for visual effect is present between the viewer and the viewing object, when the viewer moves while gazing at (the viewing target image of) the viewing object, an amount of change of the object for visual effect in the field of view is large (a change speed is high) and an amount of change of the viewing object is small (a change speed is low). A difference in the amount of change or a rate of the change is the function of the motion parallax.

FIGS. 4A to 4F are diagrams illustrating the motion parallax according to this embodiment. In a state illustrated in FIG. 4A, when the viewer 301 moves in the direction of the negative X-axis while gazing (505) at the vertical material 102a for visual effect (since the vertical object for visual effect is representatively illustrated, the vertical object for visual effect is not limited to "102a") of the object for visual effect as illustrated in FIG. 4B, the shielding position of the viewing target image 101a by the vertical material 102a for visual effect is changed as illustrated in FIG. 4C. Further, when the viewer 301 moves in the direction of the positive X-axis while gazing (507) at the vertical material 102a for visual effect as illustrated in FIG. 4D, the shielding position of the viewing target image 101a of the viewing object 101 by the vertical material 102a for visual effect of the object for visual effect is changed as illustrated in FIGS. 4E and 4F. As such, the difference between an amount of change of the object for visual effect in the field of view of the viewer and an amount of change of the point of view on the viewing object is generated according to the movement of the viewer and causes the viewer to perceive depth in the image to be viewed. As such, the use of the object for visual effect makes it possible to obtain the effect of "a sense of reality", such as a sense of three-dimension or a sense of immersion, to the viewing object.

The "shielding" is a kind of human depth perception in which, when a certain object conceals a portion of another object among a plurality of objects, the viewer perceives the object being present in front of another object. In this embodiment, since the material 102 for visual effect is provided between the viewing object 101 and the viewer 301, the viewer perceives the depth of the viewing object from the material 102 for visual effect and empirically perceives the depth on the basis of the distance between the viewing object and the object for visual effect and the spatial phase arrangement of a plurality of viewing target images of the viewing object.

The "shielding" position of the viewing object by the object for visual effect is, for example, a position where a viewing target image forming "perspective", such as a "road" 101e illustrated in FIG. 2C, is not shielded. Similarly to the "motion parallax" or the "shielding", it is preferable to arrange the object for visual effect such that the viewer can see a "linear perspective" element of the viewing object.

As above described in FIG. 3, the distance S between the viewing object and the object for visual effect can be determined according to the size of the viewing object 101 in the horizontal direction. In this embodiment, the distance S is adjusted in the range of the determined distance S to change a sense of size of the viewing target image.

Figure 5A:
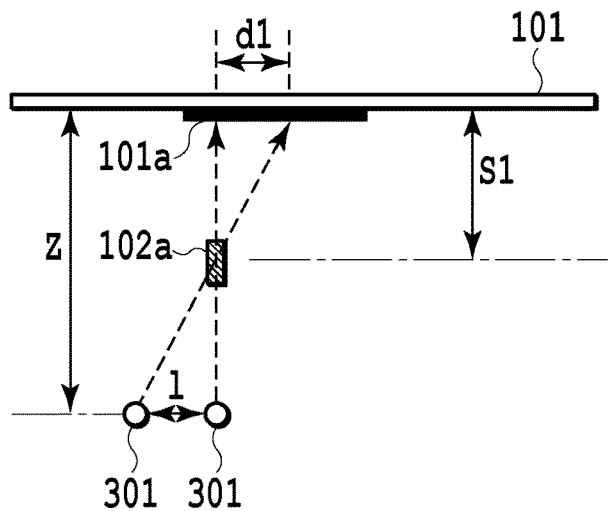
FIGS. 5A to 5C are diagrams illustrating a change in a sense of size of the viewing target image due to a change in a distance S in this embodiment.
Figure 5B:
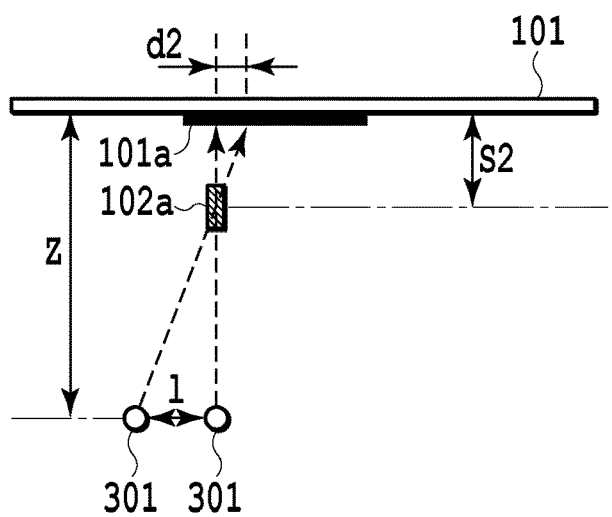
Figure 5C:
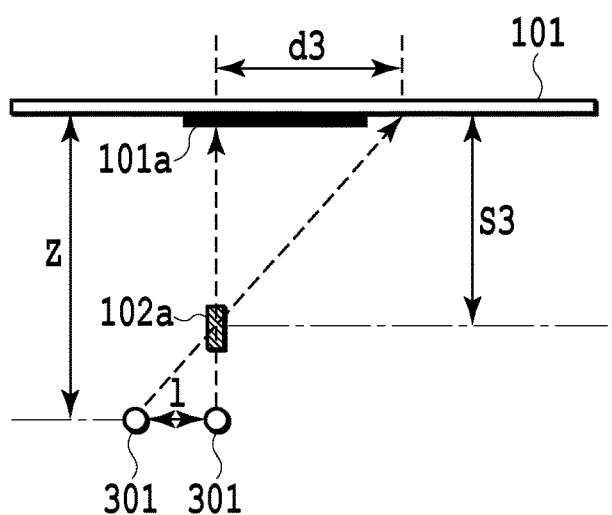

FIGS. 5A to 5C are diagrams illustrating a change in the sense of the size of the viewing target image due to a change in the distance S according to this embodiment.

FIG. 5A illustrates a state in which the size of the viewing target image 101a is perceived as a size equivalent to the actual size (hereinafter, referred to as state 1). In this case, there is a relationship of the distance S1 between the viewing object (101a) and the object for visual effect (102a) to a viewing distance (distance from the viewing object to the viewer) Z of the viewer 301. From this state, while the viewing distance Z is not changed, the distance between the viewing object (101a) and the object for visual effect (102a) is adjusted to S2 (<S1) that is less than that in state 1, as illustrated in FIG. 5B. In this state, an amount of change d2 in the viewing target image 101a by the function of motion parallax when the viewer 301 moves by a distance 1 is less than an amount of change d1 when the viewer 301 moves by the distance 1 in state 1. As a result, the viewer perceives that the size of the viewing target image 101a is greater than the actual size. On the other hand, while the viewing distance Z is not changed, the distance between the viewing object (101a) and the object for visual effect (102a) is adjusted to S3 (>S1) that is greater than that in state 1, as illustrated in FIG. 5C. In this state, an amount of change d3 in the viewing target image 101a by the function of motion parallax when the viewer 301 moves by a distance 1 is more than the amount of change d1 when the viewer 301 moves by the distance 1 in state 1. As a result, the viewer perceives that the size of the viewing target image 101a is less than the actual size.

Also in this embodiment, the distance S between the viewing object and the object for visual effect is set according to the distance between an imaging device, such as a camera, and an object, which is a viewing target image, when an image of the viewing object is captured, within the range of the distance S that is determined according to the size of the viewing object 101 in the horizontal direction as described above. More specifically, when the viewing distance Z of the viewer is constant, the distance S between the object for visual effect and the viewing object is set such that the viewing object of the captured image whose object distance is longer, the distance S becomes longer. Hereby, as described with reference to FIGS. 5A to 5C, as an image is captured at a longer distance, an amount of change in the viewing target image due to motion parallax becomes larger. In this way, the viewing target image can be perceived to be small.

Figure 6A:
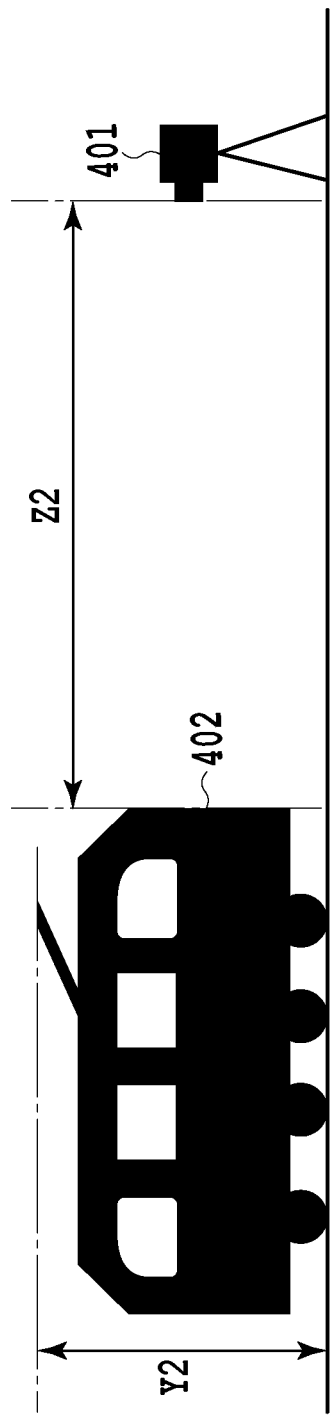
FIGS. 6A and 6B are diagrams illustrating the relationship between a viewing distance Z1 when the viewer sees a viewing object and an object distance in a case in which the viewing object is an image captured by an imaging device.
Figure 6B:
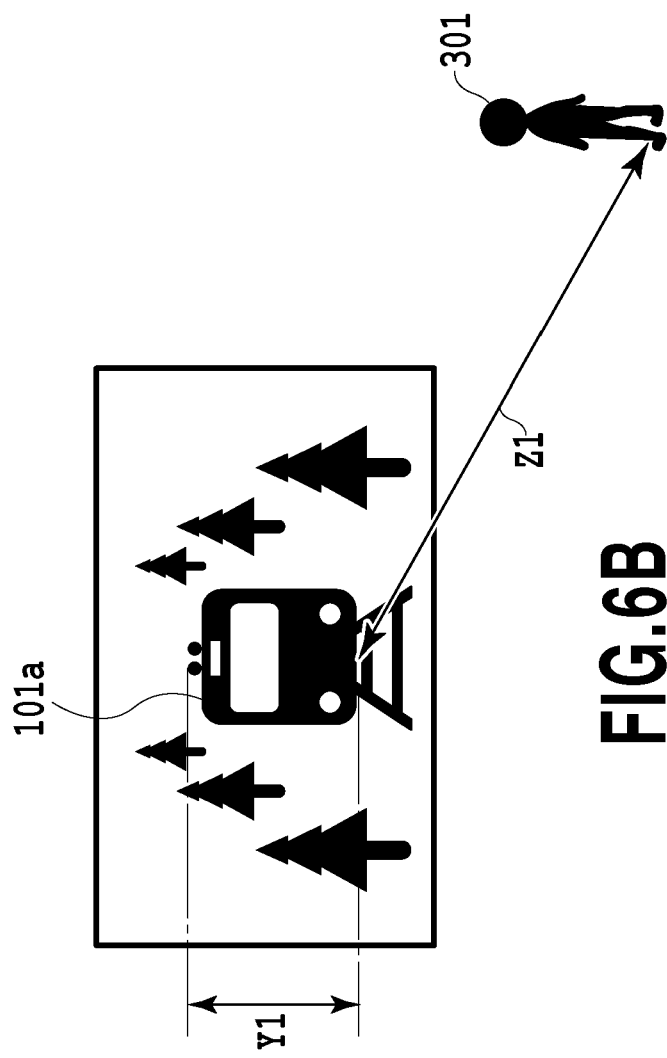

Further in this embodiment, when the viewing object is an image captured by the imaging device as illustrated in FIGS. 6A and 6B, the viewing distance Z1 at which the viewer 301 sees the viewing object is within the range that is calculated by the following Expression (1). More specifically, when the size of the viewing target image 101a of the viewing object is Y1, the distance between an imaging device 401 and a viewing target image 402 during the capture of the viewing target image is Z2, and the actual size of the viewing target image 402 is Y2, the viewing distance Z1 is represented by the following expression (1):

$$Z1 \geq (Z2 \times Y1)/Y2 \qquad \text{Expression (1)}$$

In practice, lenses with various focal lengths are attached to, for example, a digital camera, which is the imaging device, and imaging is performed. Therefore, the distance Z2 is calculated from an "angle of view", a "sensor size", and a "focal length".

The viewer empirically estimates the actual size Y2 of the viewing target image 101a of the viewing object 101 when viewing the viewing object 101, and the viewer estimates how distance at which the viewer sees the viewing target image 101a in the case that the size of the viewing target image 101a of the viewing object is Y1. From the point of view that, when a perceptive size is estimated, the perceptive size has an effect, if the viewing distance Z1 does not correspond to the estimated distance, a sense of incongruity occurs in the viewing object, which results in a reduction in a sense of reality. As described above, since the relationship among the size of the viewing target image 402 when imaging, the distance Z2 when imaging, the size of the viewing target image 101*a* of the viewing object when viewing, and the distance Z1 between the viewer and the viewing target image 101*a* is set by Expression (1), it is possible to effectively give a sense of reality to the viewer. If the distance Z1 does not satisfy Expression (1), the viewer is close to the viewing object and perceives that the size of the viewing target image of the viewing object is large. The perception size of the viewing target image 101*a* varies largely depending on the amount of movement. Therefore, the relationship between the actual environment or the distance during imaging and a size is broken. As a result, a sense of reality is not obtained.

A guide path display indicating the recommended viewing range (in FIG. 3, the range between the distance 304 and the distance 305) of the viewer may be added to the above-mentioned display set. In this case, it is possible to easily guide the viewer to the recommended viewing range.

Second Embodiment

Figure 7A:
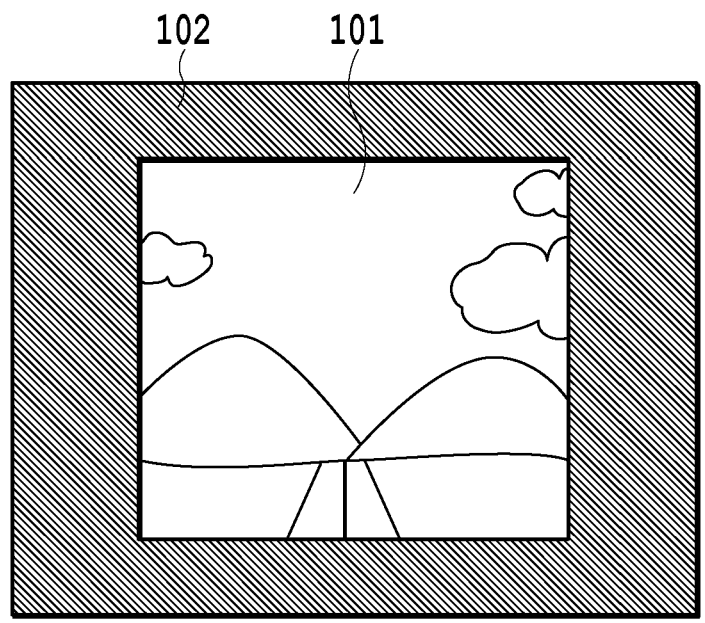
FIGS. 7A and 7B are diagrams illustrating a box-shaped display set which is the same as the display set illustrated in FIG. 2C.
Figure 7B:
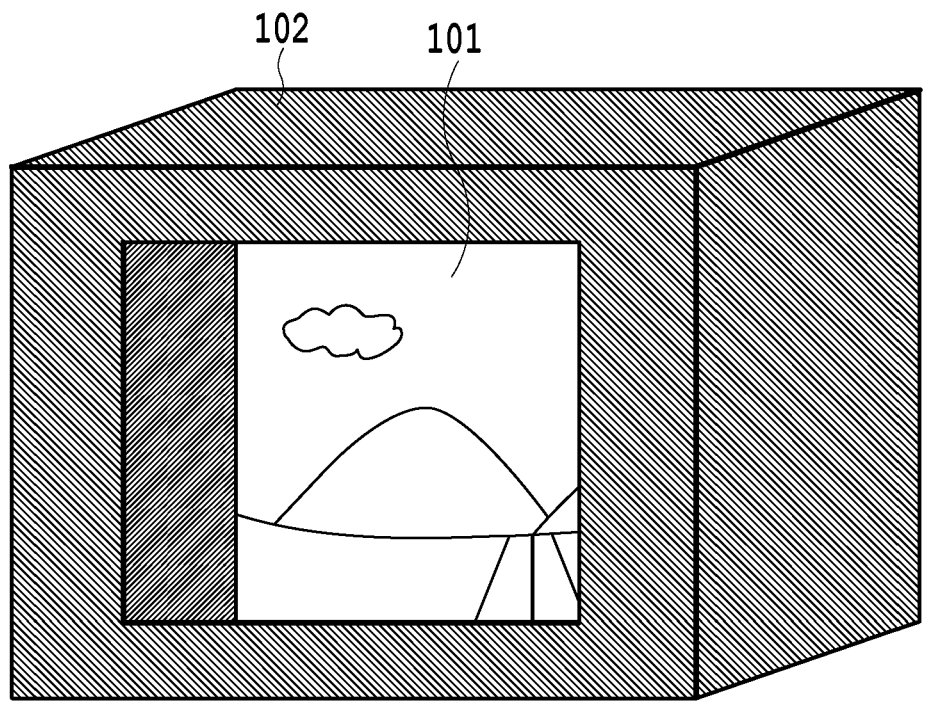

In the display set described above with respect to the first embodiment, in some cases, if the relationship between the brightness of the object for visual effect, which is a member that is present on the front side, and the brightness of the viewing object that is present on the rear side is not appropriate, motion parallax which is an element for giving a sense of reality is not effectively generated. A second embodiment of the present invention relates to a method for establishing the relationship between the brightness of the object for visual effect and the brightness of the viewing object. FIGS. 7A and 7B are diagrams illustrating a display set having the same box shape as the display set according to the first embodiment illustrated in FIG. 2C.

Figure 8:
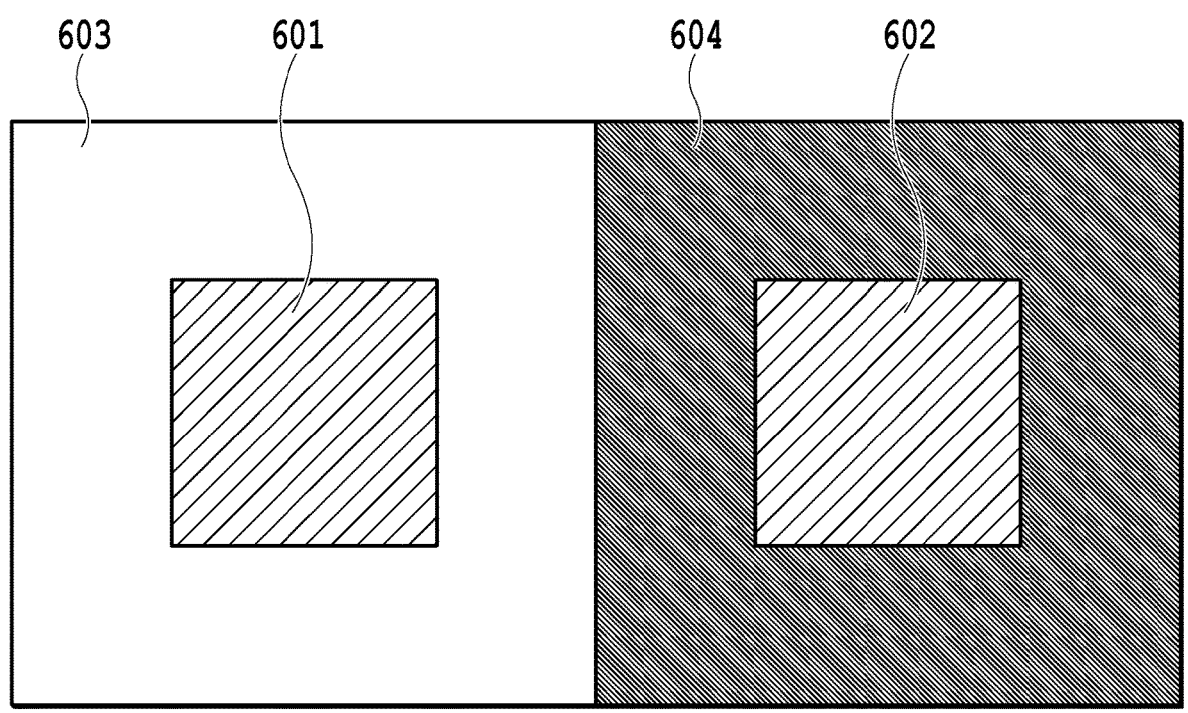
FIG. 8 is a diagram illustrating lateral inhibition which occurs in the human vision.

When the above-mentioned display set is viewed, a simultaneous brightness contrast occurs in the human eye due to the operation of a vision system which is called lateral inhibition. FIG. 8 is a diagram illustrating the phenomenon. A region 601 and a region 602 illustrated in FIG. 8 have the same physical brightness. However, for brightness perceived by the human eye, the lateral inhibition causes the region 601 to look darker than the actual brightness and causes the region 602 to look lighter than the actual brightness. The reason is that, among the nerve cell groups of a vision system, a nerve cell group suppresses the activity of adjacent nerve cell groups and a nerve cell group on which light is incident makes a strong response and suppresses the activity of neighboring nerve cell groups. Specifically, in the example illustrated in FIG. 8, since a region 603 has a lighter white color, a nerve cell group which reacts to the region 603 makes a strong response. As a result, a nerve cell group which reacts to the region 601 is inhibited. As a result, the gray in the region 601 looks darker. In contrast, since a region 604 has a darker black color, no light is incident on a nerve cell group that reacts to the region 604 and the nerve cell group does not work. As a result, a nerve cell group which reacts to the region 602 is not inhibited and the gray in the region 602 looks lighter than a region that is surrounded by white, such as the region 601.

The operation of the vision system has a great effect on a sense of reality of the viewer who sees the display set. In this embodiment, the relationship between the brightness of a viewing region of an object for visual effect and a viewing region of a viewing object which can be seen by the viewer at a viewing position is appropriately set to improve a sense of reality.

FIG. 9 is a diagram illustrating the viewing regions of the viewing object and the object for visual effect and the viewing position of the viewer according to the second embodiment of the present invention. In this embodiment, as illustrated in FIG. 9, an ideal viewing position 501 of the viewer in the display set is one specific point. That is, the ideal viewing position is a position where the best effect is obtained by the determined brightness relationship, which will be described below. When the viewer sees the viewing object at the ideal position, the viewer can see the entire region of a viewing object 101 and the entire region becomes a viewing region (hereinafter, referred to as a viewing region A1). In addition, in a material 102 for visual effect, a front region is referred to as a viewing region (hereinafter, referred to as a viewing region B1). In the example illustrated in FIG. 9, the viewer sees only the front side of the object for visual effect at the viewing position 501. Therefore, the viewing region B1 is a front portion of the material 102 for visual effect illustrated in FIG. 7A.

Hereinafter, an example in which the relationship between the brightness of the viewing region A1 and the brightness of the viewing region B1 is determined and the average value of the brightness of the viewing region B1 is determined based on the average value of the brightness of the viewing region A1 will be described.

First, a brightness value is obtained as the brightness of the viewing region A1. In this embodiment, for the viewing region A1 (the entire region of the viewing object), the brightness value of each pixel based on the original image (each of R, G, and B is 8 bits) when the viewing object is obtained is calculated by the following Expression (2):

$$Y = 0.299 \times R + 0.587 \times G + 0.114 \times B \qquad \text{Expression (2)}$$

Then, the sum of the calculated brightness values of all of the pixels is calculated and is divided by the total number of pixels to calculate the average brightness value of the viewing region A1.

Then, an intermediate value of a predetermined brightness value is calculated in order to determine whether the original image is a light image or a dark image. In this embodiment, each of R, G, and B of the original image is 8 bits, the upper limit of the brightness value calculated from the original image is 255, and the lower limit thereof is 0. Therefore, the intermediate value of the brightness value is 128. Then, it is determined whether the viewing region A1 is light or dark (the current image is light or dark). In this embodiment, the average brightness value and the intermediate value are used for the determination. If the average brightness value is equal to or greater than the intermediate value, the viewing region A1 is determined to be a "light image". If the average brightness value is less than the intermediate value, the viewing region A1 is determined to be a "dark image".

Then, the range of the average brightness value of the viewing region B1 is determined on the basis of the determination result to determine the relationship between the brightness of the viewing region A1 and the brightness of the viewing region B1. If it is determined that the viewing region A1 is a light image, for the brightness of the viewing region B1, the average brightness value of the viewing region B1 is set to be equal to or less than the average brightness value (average value) of the viewing region A1. On the other hand, if it is determined that the viewing region A1 is a dark image, for the brightness of the viewing region B1, the average brightness value of the viewing region B1 is set to be equal to or greater than the average brightness value (average value) of the viewing region A1. The average brightness value of the viewing region B1 is determined as described above to determine the brightness of the object for visual effect.

Figure 10A:
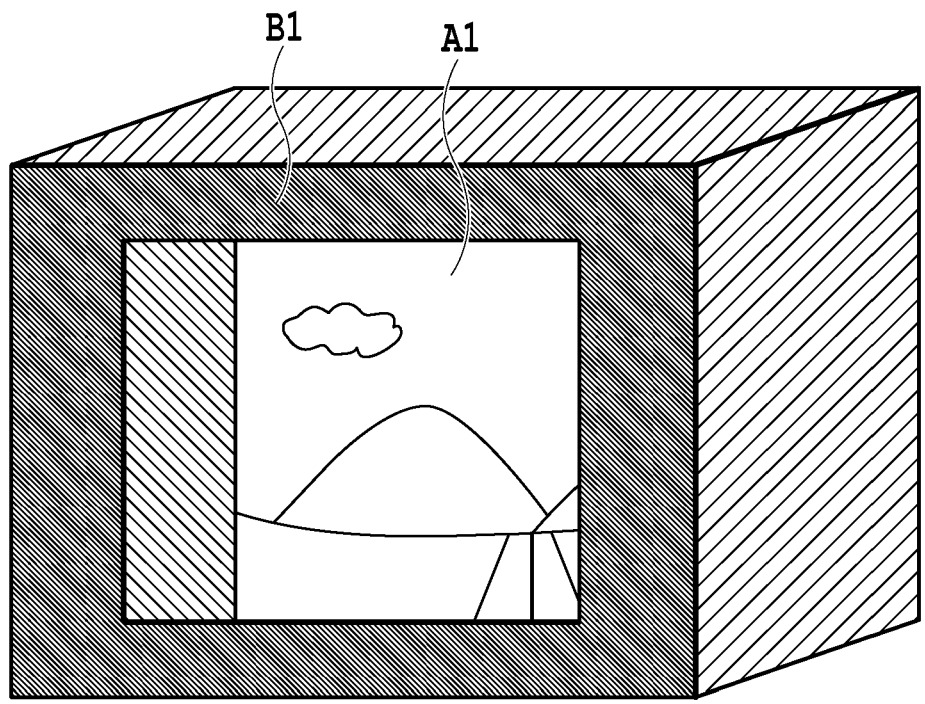
FIGS. 10A and 10B are diagrams illustrating the brightness of a viewing object and an object for visual effect based on brightness determination according to a second embodiment.
Figure 10B:
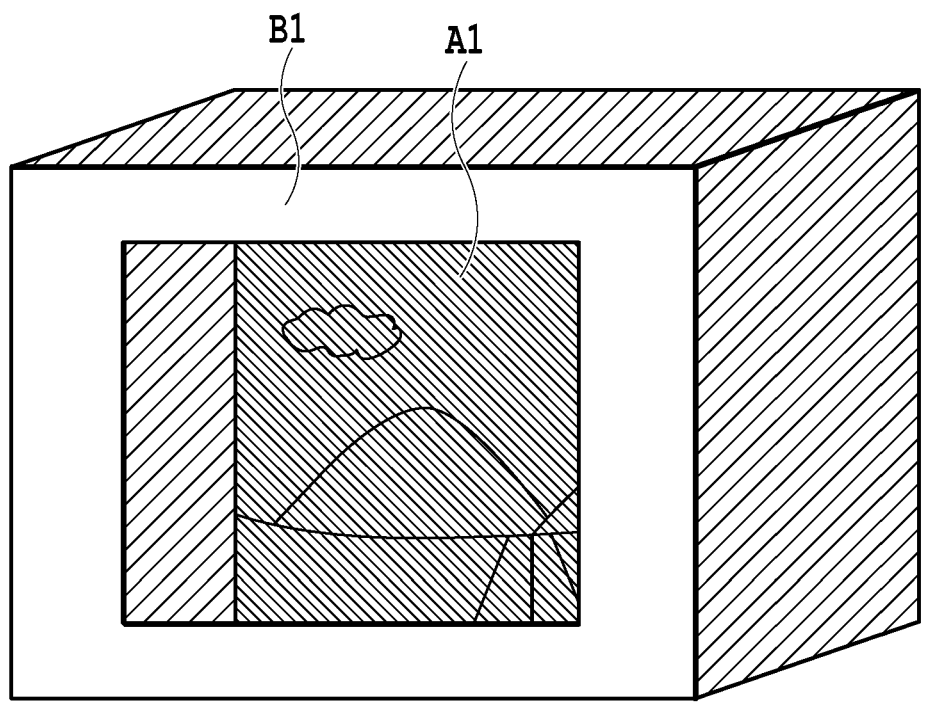

In this embodiment, for example, if it is determined that the viewing object 101 is a light image, the brightness of the viewing region B1 is adjusted to black (a brightness value of 0). If it is determined that the viewing object 101 is a dark image, the brightness of the viewing region B1 is adjusted to white (a brightness value of 255). FIGS. 10A and 10B are diagrams illustrating the brightness of the viewing object and the object for visual effect on the basis of brightness determination according to this embodiment. FIG. 10A illustrates a case in which the viewing object is determined to be a light image, in which the viewing region B1 is "black". FIG. 10B illustrates a case in which the viewing object is determined to be a dark image, in which the viewing region B1 is "white". In this embodiment, the viewing region B1 has a uniform color, the average brightness value of the viewing region B1 can be directly measured and can be calculated according to the color of the viewing region B1. When the object for visual effect has wallpaper, which is a printed matter, attached thereto, the average brightness value of the viewing region B1 may be calculated from the brightness value of the printed original image, similarly to the viewing region A1.

Figure 11A:
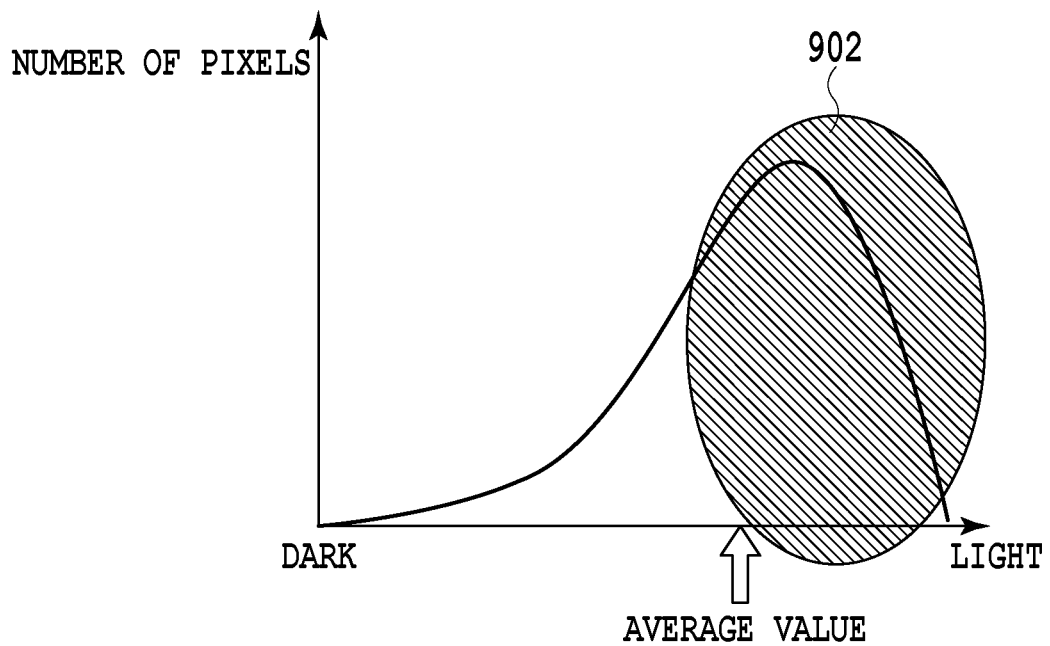
FIG. 11A is a diagram illustrating a histogram of an image of a viewing region A1 when the viewing region A1 is determined to be a light image and FIG. 11B is a diagram illustrating the perception of brightness by the human eye using the relationship between an input and an output.
Figure 11B:
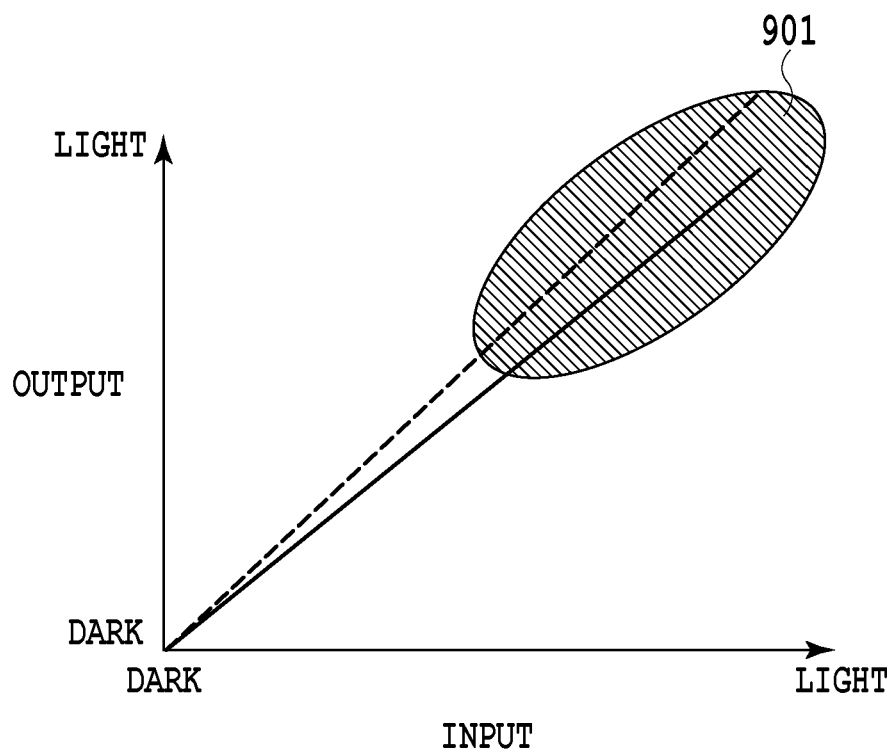

FIG. 11A illustrates a histogram of the image of the viewing region A1 when the viewing region A1 is determined to be a light image and FIG. 11B is a diagram illustrating the perception of brightness by the human eye using the relationship between an input and an output.

In this embodiment, when the viewing region A1 is determined to be a light image, the average brightness value of the viewing region B1 is set to the lowest brightness value (0: black) in the range that is equal to or less than the average brightness value of the viewing region A1, as illustrated in FIG. 11A. As a result, as illustrated in FIG. 11B, the viewer perceives the viewing region A1 as represented by a dashed line (a solid line indicates a linear relationship between the input and the output and indicates a state in which the effect of this embodiment is not obtained). That is, the apparent dynamic range of perception is widened such that the dashed line is located above the solid line. As such, when the average brightness of the viewing region B1 is lower than the average brightness of the viewing region A1, it is possible to increase a brightness contrast effect in a light region which is illustrated as a region 901 in FIG. 11B in the human vision system. As a result, it is possible to widen the dynamic range of a main light portion of an image illustrated in a region 902 of FIG. 11A, in particular, in terms of perception.

Figure 12A:
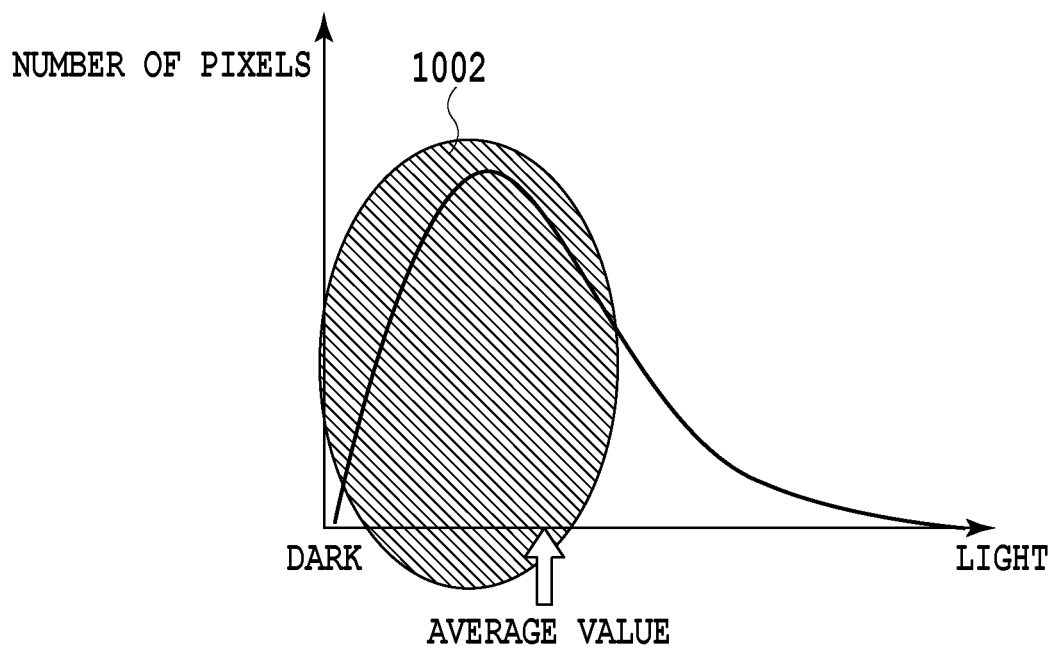
FIG. 12A is a diagram illustrating a histogram of an image of the viewing region A1 when the viewing region A1 is determined to be a dark image and FIG. 12B is a diagram illustrating the perception of brightness by the human eye using the relationship between an input and an output.
Figure 12B:
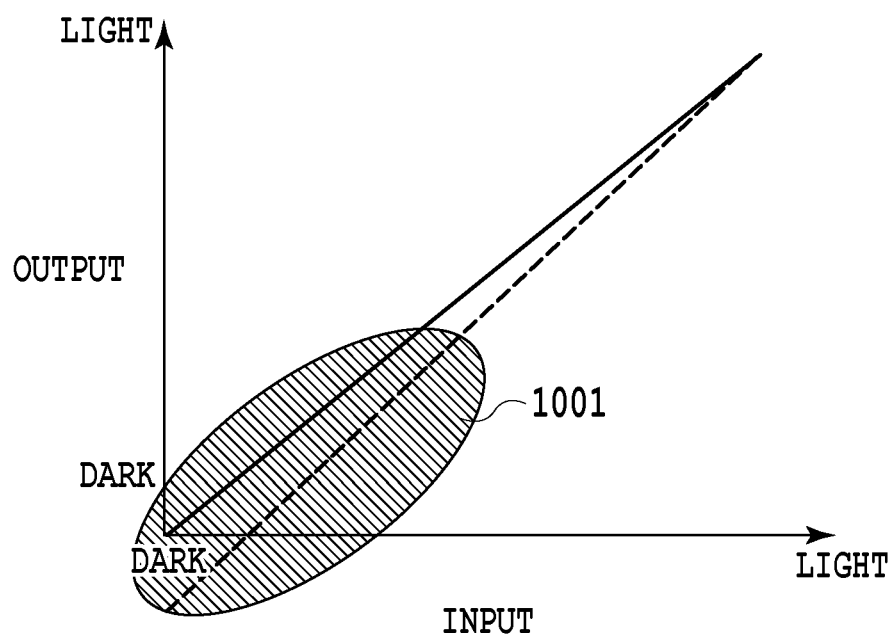

On the other hand, FIG. 12A illustrates a histogram of the image of the viewing region A1 when the viewing region A1 is determined to be a dark image and FIG. 12B is a diagram illustrating the perception of brightness by the human eye using the relationship between an input and an output.

In this embodiment, when the viewing region A1 is determined to be a dark image, the average brightness value of the viewing region B1 is set to the highest brightness value (255: white) in the range that is equal to or greater than the average brightness value of the viewing region A1, as illustrated in FIG. 12A. As a result, as illustrated in FIG. 12B, the viewer perceives the viewing region A1 as represented by a dashed line (a solid line indicates a linear relationship between the input and the output and indicates a state in which the effect of this embodiment is not obtained). That is, the apparent dynamic range of perception is widened such that the dashed line is located below the solid line. As such, when the average brightness of the viewing region B1 is higher than the average brightness of the viewing region A1, it is possible to increase a brightness contrast effect in a dark region which is illustrated as a region 1001 in FIG. 12B in the human vision system. As a result, it is possible to widen the dynamic range of a main dark portion of an image shown in a region 1002 of FIG. 12A, in particular, in terms of perception.

The effect of the brightness relationship that the apparent dynamic range of perception is widened described above decreases as the distance (difference) between the average brightness value of the viewing region B1 and the average brightness value of the viewing region A1 decreases, and increases as the distance increases.

As described in this embodiment, the relationship between the brightness of the viewing region A1 and the brightness of the viewing region B1 is appropriately set to widen the dynamic range of the viewing region A1 of the viewing object in terms of perception. Therefore, motion parallax is effectively generated by the viewing region A1 and the viewing region B1 and a sense of reality of the display set, such as a sense of three-dimension or a sense of immersion, is improved. In addition, since the dynamic range is widened, the distinctiveness of contrast and gradation is improved and it is possible to improve a sense of reality.

When the viewing object is not a printed matter and data of the original image is not provided, such as a picture, a brightness index, such as a brightness value, may be directly measured.

Modification Example of Second Embodiment

Figure 13:
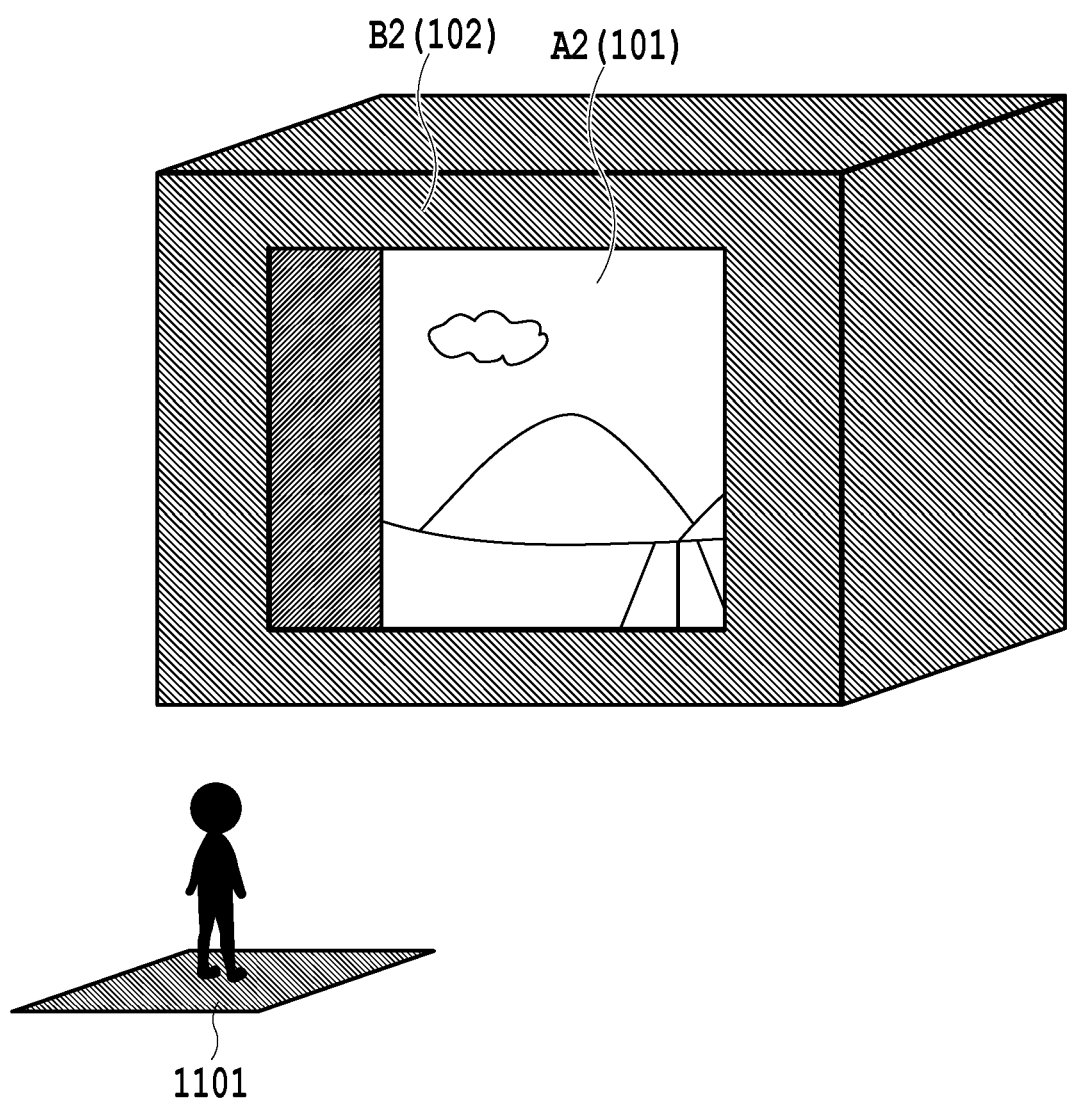
FIG. 13 is a diagram illustrating viewing regions of a viewing object and an object for visual effect and a viewing region of a viewer in a modification example of the second embodiment.

This modification example differs from the second embodiment in that the viewing position of the viewer who receives the effect of the brightness relationship that the apparent dynamic range of perception is widened when the viewer sees the display set is a range having a predetermined width as a recommend viewing range 1101 illustrated in FIG. 13, and the brightness of the viewing region is adjusted by a light. In addition, in this modification example, it is determined whether a region is light or dark on the basis of the difference between an intermediate value and an upper limit value or a lower limit value.

Figure 14:
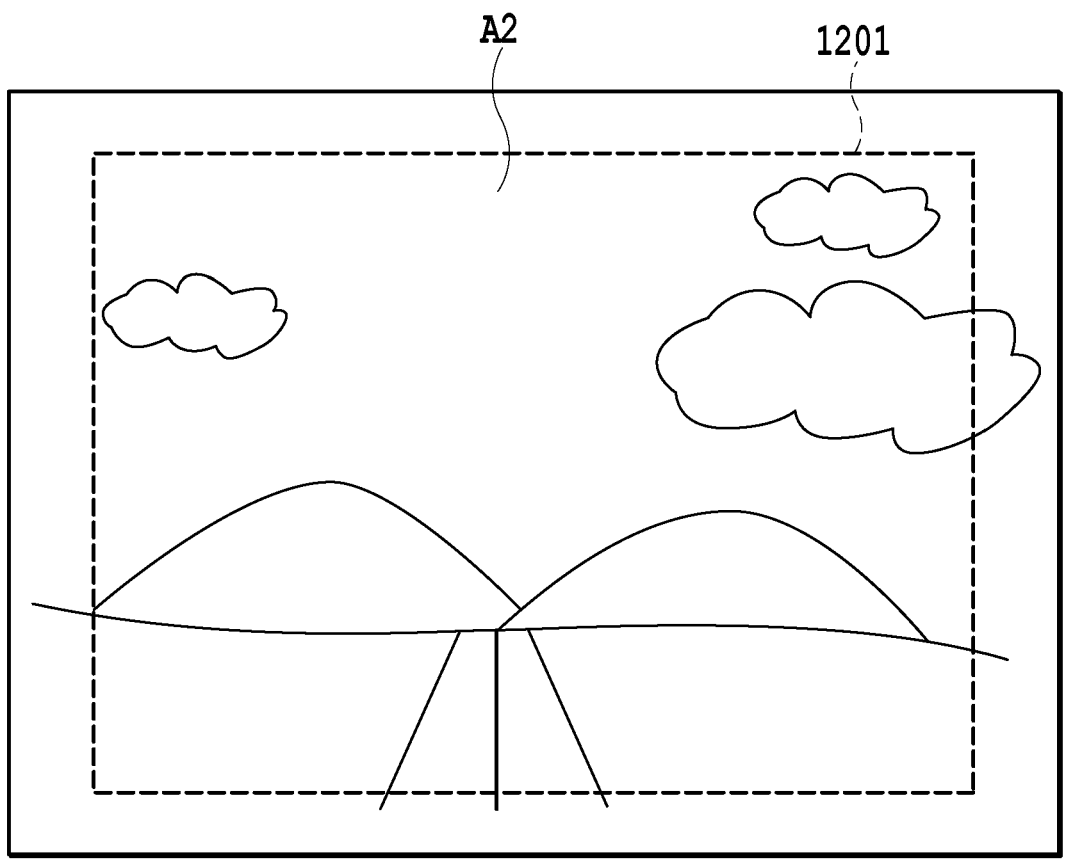
FIG. 14 is a diagram illustrating the viewing region of the viewing object in the modification example of the second embodiment.

FIG. 13 is a diagram illustrating viewing regions of a viewing object and an object for visual effect and a viewing region of the viewer in the modification example of the second embodiment of the present invention. As illustrated in FIG. 13, a viewing region B2 of a material 102 for visual effect is a front region. In addition, the viewing position of the viewer is an arbitrary position in the range of a region 1101. For this reason, in this modification example, when the viewer sees the viewing object at an arbitrary position in a predetermined range, a portion of the viewing object is not seen. Therefore, the region (a range represented by a dashed line 1201 in FIG. 14) which can be seen by the viewer in an entire predetermined range is referred to as a viewing region A2.

First, a brightness value is obtained as the brightness of the viewing region A2. In this modification example, as illustrated in FIG. 15, the brightness of a viewing object 101 is adjusted by two lights 1301 and 1302 and the brightness of the material 102 for visual effect is adjusted by one light 1303. Therefore, in this modification example, the brightness of the viewing region A2 which is adjusted by two lights 1301 and 1302 is measured by a measurement device, such as a radiance meter, at a predetermined pitch that can be measured by the measurement device. In this way, the brightness value of the viewing region A2 is obtained. The sum of the obtained brightness values of the entire region is obtained and is divided by the number of measurement points to calculate the average brightness value of the viewing region A2.

Then, the upper limit and lower limit of a predetermined brightness value are obtained in order to determine whether the image of the viewing region A2 is a light image or a dark image. In this modification example, the upper limit and lower limit of the brightness value are obtained from a measurement patch including white (the upper limit of the brightness value of the viewing object) which can be represented by the same material as that forming the viewing object 101 and black (the lower limit of the brightness value of the viewing object) which can be represented by the same material as that forming the viewing object 101.

Then, it is determined whether the viewing region A2 is light or dark (the image is light or dark). In this modification example, the determination is performed on the basis of the average brightness value of the viewing region A2 and the measured upper limit and lower limit described above. A difference A between the upper limit and the average brightness value and a difference B between the average brightness value and the lower limit are calculated and the difference A is compared with the difference B. When the difference A is more than the difference B (the difference A is equal to or more than the difference B), the viewing region A2 is determined to be a "light image". When the difference B is more than the difference A (the difference A is less than the difference B), the viewing region A2 is determined to be a "dark image".

A process of determining the range of the average brightness value of the viewing region B2 and a process of determining the brightness of the object for visual effect are performed on the basis of the determination result. These processes are the same as those in the second embodiment.

In this modification example, the average brightness value of the viewing region B2 can be determined by a radiance meter in an environment in which the brightness of the viewing region B2 is adjusted by the light 1303, similarly to the viewing region A2. Therefore, in this modification example, for example, the illuminance of the light 1303 is adjusted such that the average brightness value of the viewing region B2 is within a determined range.

In this modification example, as compared to the above described second embodiment, the brightness contrast relationship between the viewing region A2 and the viewing region B2 can be established on the basis of the range (viewing region A2) in which the viewer can see the viewing object. Therefore, it is possible to widen the dynamic range of the viewing region A2 in terms of perception in a state suitable for a viewing environment. As a result, motion parallax is effectively generated by the viewing region A1 and the viewing region B1 and a sense of reality of the display set, such as a sense of depth or a sense of immersion, is improved. In addition, since the dynamic range is widened, the distinctiveness of contrast and gradation is improved and it is possible to improve a sense of reality. In the second embodiment, when the brightness of the viewing region B1 is changed, for example, it is necessary to change the attached printed matter to change the brightness of the object for visual effect. However, in this modification example, for example, the illuminance of the light is adjusted to change the brightness of the viewing region. As a result, it is possible to easily establish the brightness relationship according to the invention.

In each of the above-described embodiments, the brightness of the viewing region A is fixed and the brightness of the viewing region B is changed to determine the brightness of the viewing region A and the brightness of the viewing region D. However, the present invention is not limited thereto. Any configuration may be used as long as the relationship between the brightness of the viewing region A and the brightness of the viewing region B determined in the present invention is satisfied. For example, the brightness of the viewing region A may be variable and the brightness of the viewing region B may be fixed, or both the brightness of the viewing region A and the brightness of the viewing region B may be variable.

In each of the above-described embodiments, the range of the brightness of the viewing region is determined on the basis of the brightness value. However, the present invention is not limited thereto. A brightness value or a density value may be used as a value defining brightness and the range of the brightness may be determined by the same method as described above. When the brightness value or the density value is used, it is possible to perform measurement using a colorimeter.

In each of the above-described embodiments, for example, as illustrated in FIG. 9, the front viewing region of the object for visual effect is used as a region which can be seen by the viewer in the object for visual effect. However, the present invention is not limited thereto. A region of the object for visual effect which can be seen by the viewer may be used as the viewing region. In addition, the viewing region (object for visual effect) has a uniform pattern. However, the present invention is not limited thereto. The viewing region may be any image or pattern in the range of the determined range of the average brightness value.

Third Embodiment

A third embodiment of the present invention relates to a display method and a display set which can effectively obtain the effect of "shielding" an image in a display portion of a viewing object by an object for visual effect and can prevent, particularly, the generation of a sense of incongruity for depth. Specifically, in some cases, the size of the viewing object or a recommend viewing distance is limited by, for example, a display environment and Expression (1) described in the first embodiment is not satisfied. The third embodiment of the present invention, as described with reference to FIGS. 5A to 5C in the first embodiment, controls a distance of the object for visual effect such that a viewing target image on the viewing object is perceived to look larger or smaller than the actual size. In this way, the incongruity of the viewing distance and the perceived size when Expression (1) is not satisfied is reduced.

FIGS. 16A to 16F are diagrams illustrating the control of the distance of the object for visual effect according to the third embodiment of the invention. A distance S6 between the object for visual effect and the viewing object illustrated in FIGS. 16A, 16B, 16E and 16F is set by the following two expressions. In Expressions (3) and (4), Y3 is the size of a viewing target image 101*a* of the viewing object and Y1 is the size of the viewing target image 101*a* defined by Expression (1). Expressions (3) and (4) indicate a corresponding distance S6 when the size of the viewing target image of the viewing object does not correspond to the actual size of an object image, which is the source of the viewing target image, in a proportional relationship (Expression (1)) with the distance of the viewing recommend position from the viewing object during viewing. That is, when the size Y3 of the viewing target image is greater than the ideal size Y1, the distance S6 is set to be increased by Expression (3). In this way, an amount of change in the viewing target image due to motion parallax increases and the viewing target image is perceived to be small. When the size Y3 of the viewing target image is equal to or less than the ideal size Y1, the distance S6 is set to be decreased by Expression (4) and the viewing target image is perceived to be large.

If $Y3>Y1, S6=(Z1/2)\times(1+Y1/Y3)$  Expression (3)

If $Y3 \leq Y1, S6=(Z1/2)\times(2-Y1/Y3)$  Expression (4)

The distance S6 is not uniformly determined due to the human visual characteristics. In this embodiment, it is assumed that the object for visual effect and the viewing object which are separated from each other are seen by peripheral vision (a viewing angle of 10 degrees) and the distance S6 has a width dS which is calculated by Expression (5), with respect to a distance z in a recommended viewing range:

$$ds = z \cdot \tan \theta (\theta = 5°)$$  Expression (5)

Here, when Y3>Y1 is satisfied, the distance S6 from the viewing object to the object for visual effect is determined by Expression (3). However, a material 102a for visual effect has a width in the z direction in FIGS. 16A, 16B, 16E and 16F. Therefore, the size of a shielded portion when the viewer sees the viewing target image varies depending on the width. As a result, in particular, there is a difference in the perception of the depth. In contrast, according to the embodiment of the invention, for the distance S6 determined by the above-mentioned Expression (3), the distance of the object for visual effect is determined as follows.

Figure 16A:
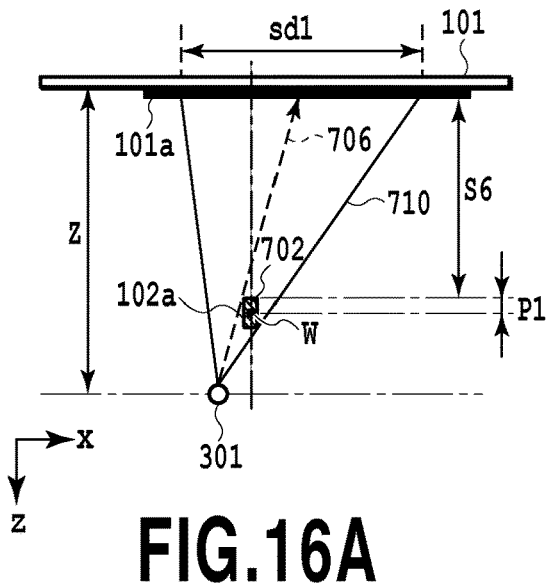
FIGS. 16A to 16F are diagrams illustrating the control of the distance to an object for visual effect in a third embodiment of the invention.

As illustrated in FIG. 16A, when the distance between the material 102a for visual effect and a viewer 301 is less than the distance between the material 102a for visual effect and a viewing object 101, the distance S6 between the material 102a for visual effect and the viewing object 101 is set with reference to a surface 702 of the material 102a for visual effect which is closer to the viewing object 101. When the distance between the material 102a for visual effect and the viewing object 101 is set in this way, the viewer 301 sees the viewing object 101 while putting the material 102a for visual effect into a field of view 710 and an image in the field of view is seen as illustrated in FIG. 16C. In FIG. 16C, a region 712 is a region in which the material 102a for visual effect is occupied in a field of view sd1. As such, when the object for visual effect is used, a portion of the viewing object is shielded. However, as described above, the "shielding" is an element of the human depth perception and generates a sense of depth. In addition, when the viewing object 101 is a printed matter, the "shielding" by the object for visual effect has a function of concealing an element that reduces "a sense of reality", such as the boundary between printed matters or the ends of the printed matters.

Figure 16B:
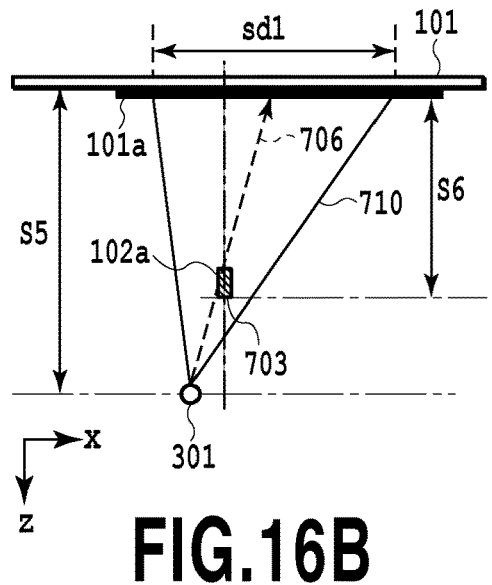
Figure 16C:
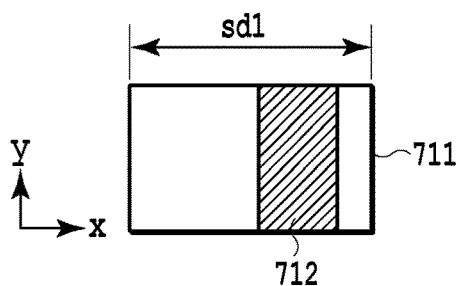
Figure 16D:
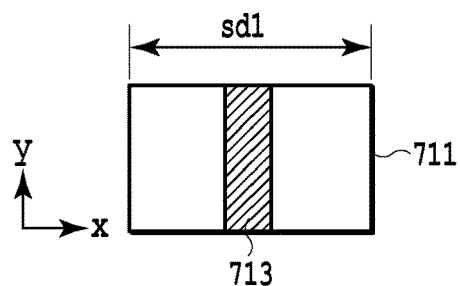

For the setting of the distance illustrated in FIG. 16A, if the distance S6 is set to a distance between a surface 703 of the material 102a for visual effect which is closer to the viewer 301 and the viewing object as illustrated in FIG. 16B, a region 713 (FIG. 16D) is "shielded" by the material 102a for visual effect which is occupied in the field of view with the same width sd1 as that in FIG. 16A. The area of the region 713 at a viewing angle is less than that of the region 712. As a result, the "shielding" effect is reduced.

In the above-mentioned example, for simplicity of explanation, the distance is set with reference to the surface 702 which is closer to the viewing object 101. However, as illustrated in FIG. 16A, the distance may be set with reference to a position in a region P1 from the surface 702 which is closer to the viewing object 101 to the center of gravity W of the material 102a for visual effect. The center of gravity W is determined as follows. For example, when the cross-sectional shape of the object for visual effect in the x-z plane does not change depending on y like the member 201 illustrated in FIGS. 2A to 2D, the center of gravity W may be the center of mass of the object for visual effect. In addition, in a case in which the cross-sectional shape of the object for visual effect in the x-z plane changes like the members 202 and 203 illustrated in FIGS. 2A to 2D, the center of gravity W may be the center of gravity of the x-z plane when the viewer looks straight at the viewing object, that is, when the height y' of the object for visual effect is equal to the height of the line of sight of the viewer.

As described above, when the distance between the material 102a for visual effect and the viewer 301 is less than the distance between the material 102a for visual effect and the viewing object 101, the distance S6 is set according to Expression (3) and the distance S6 is based on a position in the region extending from the surface 702 of the material 102a for visual effect which is closer to the viewing object 101 to the center of gravity W. Therefore, it is possible to increases the "shielding" effect obtained by the material 102a for visual effect. As a result, a person can supplement empirical cues to perceive depth or a sense of three-dimension and to improve "a sense of reality" of the viewing object, such as a sense of three-dimension or a sense of immersion.

In the display set according to this embodiment, since the distance between the viewer and the viewing object is sufficiently long, it is possible to reduce the influence of binocular cues providing depth information when viewing a scene with both eyes, which is an element of the human depth perception, on a sense of depth. However, even if it is difficult to ensure a sufficient distance between the viewer and the viewing object, the position of the object for visual effect is set as illustrated in FIG. 16A to reduce the influence of binocular vision. As a result, it is possible to give a sense of depth even in monocular vision.

Figure 16E:
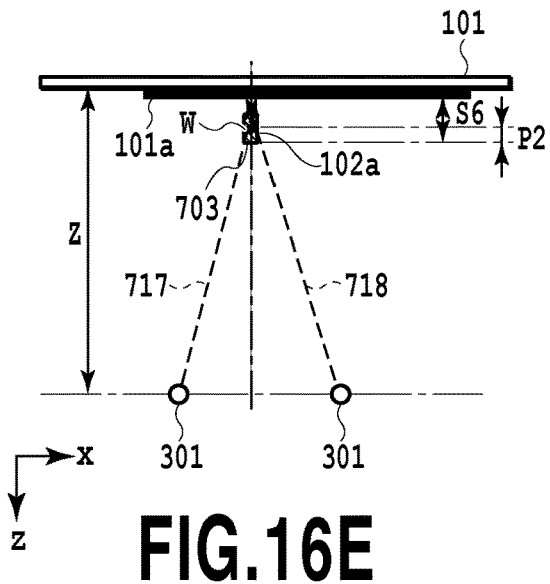
Figure 16F:
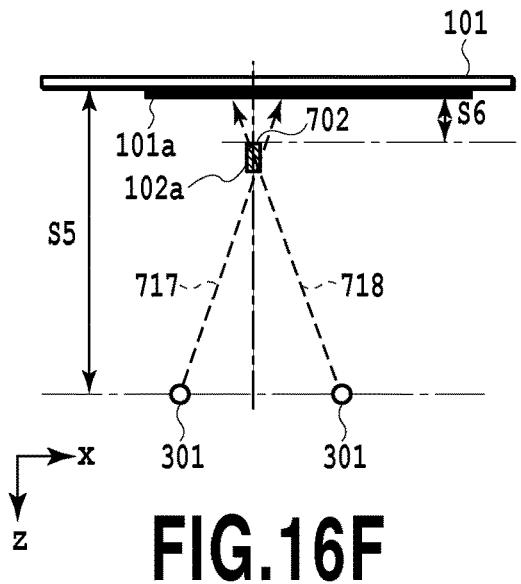

On the other hand, as illustrated in FIG. 16E, when the distance between the material 102a for visual effect and the viewing object 101 is less than the distance between the material 102a for visual effect and the viewer 301, the distance S6 is obtained by Expression (4) and a position in the region P2 extending from the surface 703 of the material 102a for visual effect which is closer to the viewer 301 to the center of gravity W is a reference for the distance S6. When the material 102a for visual effect is closer to the viewing object 101, the viewing target image 101a of the viewing object 101 is perceived to be large within the field of view, as compared to the state illustrated in FIG. 16A. In this case, it is preferable that the material 102a for visual effect is moved closer to the viewing object 101 and shields the viewing object in order to obtain the "shielding" effect. Therefore, when the material 102a for visual effect is closer to the viewing object 101, the distance S6 of the material 102a for visual effect from the viewing object 101 is set with reference to the surface 703 of the material 102a for visual effect which is closer to the viewer 301. In this way, the "shielding" effect obtained by the material 102a for visual effect makes it possible to supplement human empirical cues to perceive depth and a sense of three-dimension and to improve "a sense of reality" of the viewing object, such as a sense of three-dimension or a sense of immersion.

In the example illustrated in FIGS. 6A and 6B, when viewing the viewing object, the viewer empirically estimates the size Y2 of the viewing target image 101a of the viewing object 101 which is equivalent to the actual size. When the size of the viewing target image 101a of the viewing object is Y1, the viewer estimates the viewing distance from the object 402. When a perceptive size is estimated, the perceptive size is affected by a perceptive distance. From this point of view, when the viewing distance Z1 is not equal to the estimated distance, a sense of reality is reduced due to a sense of incongruity for the viewing object. The relationship between the size of the object 402 and the distance between the object and a photographer during imaging and the relationship between the size of the viewing target image 101a in the viewing object and the distance between the viewer and the viewing target image 101a during viewing are appropriately set by Expression (1). Therefore, it is possible to effectively give a sense of reality to the viewer.

Modification Example of Third Embodiment

FIGS. 17A to 17D are diagrams illustrating a display set according to a modification example of the third embodiment. FIG. 17A is a cross-sectional view illustrating the display set as viewed from a x-axis direction. FIG. 17B is a perspective view illustrating the display set as downwardly seen from above. FIG. 17C is a front view illustrating a viewing object.

The display set according to this modification example is a display that enables a viewer 801 who stands on a material 805 for visual effect, which is one of materials 804 to 807 for visual effect, to feel a sense of height from a viewing object 802, that is, a sense of depth in the Z direction such that the viewer 801 feels a sense of reality. When the viewer 801 sees the viewing object 802 at a position in a recommended viewing range 810, a height (S7 in the example illustrated in FIG. 17A) from a floor 803 on which the viewing object 802 is installed to the eye of the viewer 801 is defined as a recommend viewing distance Z1.

The content of the viewing object may be the viewing object illustrated in FIGS. 2A to 2D. Since also in the display set illustrated in FIGS. 17A to 17D, the object for visual effect is provided between the viewer and the viewing object, it is possible to obtain a sense of depth for the same reason as described in the third embodiment. However, as illustrated in FIGS. 17A and 17B, since the viewer 801 looks down at the viewing object, it is preferable to use a display having depth in the z-axis direction, such as a picture of the ground taken at the top of a building illustrated in FIG. 17C or a picture of a valley taken at the ground, in order to further improve the sense of reality. In addition, when the viewing object 802 is installed, a "linear perspective" element 818 may be provided at the viewer's feet side as illustrated in FIG. 17C. As illustrated in FIG. 17D, the viewing object 802 may be rotated 90 degrees. As illustrated in FIG. 17D, when the perspective element 818 is provided at a position other than the viewer's feet, the viewer feels a "sense of height". As a result, "a sense of reality" is improved. In FIGS. 17A and 17D, the material 806 for visual effect is a transparent material, such as an acrylic plate or a glass plate. Therefore, the viewing object 802 is seen through the material 806 for visual effect and a motion parallax effect is obtained by the object for visual effect. As a result, it is possible to improve a sense of reality. In addition, in FIGS. 17A to 17D, a part 807 of the object for visual effect has a wall structure that surrounds the viewing object 802. However, since the part 807 of object for visual effect does not generate the above-mentioned depth effect, it is not necessarily provided in the display set according to this modification example.

Next, in the display set according to this modification example, how to arrange the material 804 for visual effect with respect to the distance between the material 804 for visual effect and the viewer 801 or the viewing object 802 will be described in detail with reference to FIGS. 18A to 18D. FIGS. 18A to 18D are diagrams illustrating methods for arranging the object for visual effect according to this modification example.

Figure 18A:
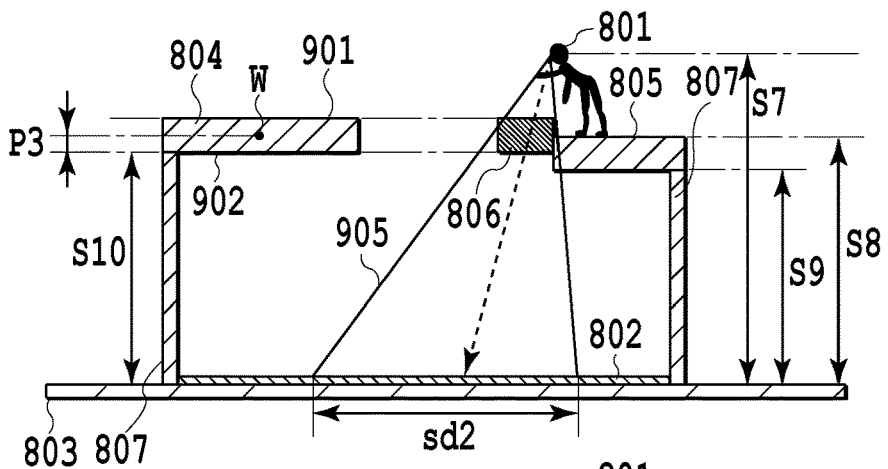
FIGS. 18A to 18D are diagrams illustrating methods for arranging an object for visual effect according to the modification example of the third embodiment.
Figure 18B:
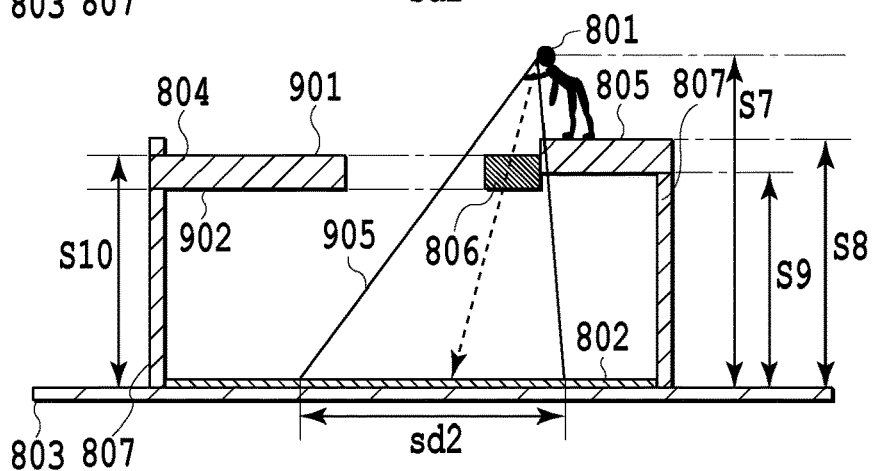

In this modification example, as illustrated in FIG. 18A, when the distance between the material 806 for visual effect and the viewer 801 is less than the distance between the material 806 for visual effect and the viewing object 802, a distance S10 between the material 804 for visual effect and the viewing object 802 is set with reference to a position in a region P3 from a surface 902 which is closer to the viewing object 802 in the materials 804 and 806 for visual effect which do not come into contact with the viewer 801 to the center of gravity W of the materials 804 and 806. The range of the material 806 for visual effect which is included in a field of view 905 when the viewer 801 gazes at the viewing object 802 is wider than that when the distance S10 is set with reference to a surface 901 closer to the viewer as illustrated in FIG. 18B, and the "shielding" effect is easily obtained, as described in the third embodiment.

Figure 18C:
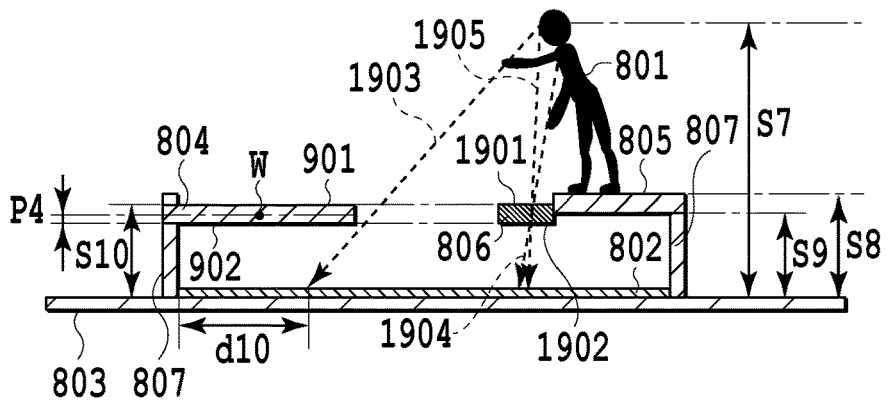
Figure 18D:
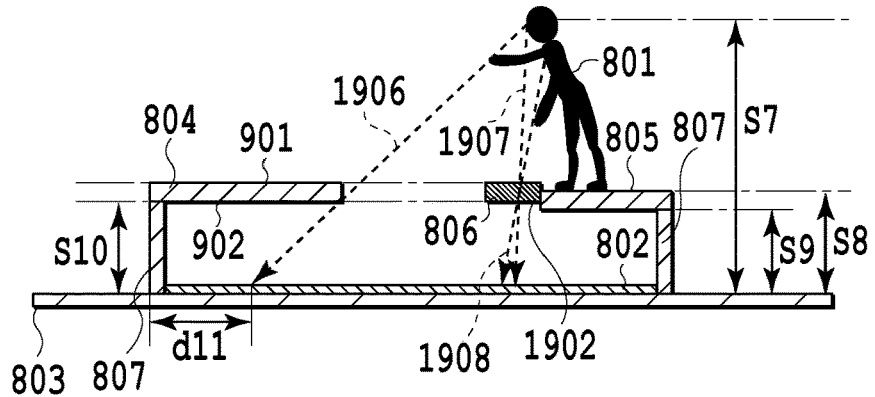

On the other hand, as illustrated in FIG. 18C, when the materials 804 and 806 for visual effect are closer to the viewing object 802 than to the viewer 801, the distance S10 from the viewing object 802 is set with reference to a position in a region P4 extending from the surface 901 which is closer to the viewer 801 in the materials 804 and 806 for visual effect to the center of gravity W of the materials 804 and 806. Also in this case, a ratio of covering the viewing object by the object for visual effect is greater than that in the case that the material 804 and 806 for visual effect is set with reference to the surface 902 which is closer to the viewing object 802 as illustrated in FIG. 18D and it is easier to obtain the "shielding" effect, as described in the third embodiment.

As can be seen from the above-described modification example, the application of the present invention is not limited to the structure in which the ideal size Y1 of the viewing target image is not achieved due to restrictions in the display environment and is supplemented by the distance S6 calculated by Expression (3) or (4) as in the third embodiment. The present invention may be applied to the setting of the distance between the viewing object and the object for visual effect in a display set which does not have the above-mentioned restrictions.

As described above, the object for visual effect according to this modification example has the effect of enabling a person to supplement empirical cues to perceive depth or a sense of three-dimension and improving "a sense of reality" of the viewing object, such as a sense of three-dimension or a sense of immersion.

Fourth Embodiment

A fourth embodiment of the present invention controls the distance of an object for visual effect such that a viewing target image on a viewing object is perceived to be larger or smaller than a size equivalent to the actual size, thereby reducing the incongruity of a viewing distance and a perceived size when Expression (1) is not satisfied.

FIGS. 19A to 19D are diagrams explaining the control of the distance of the object for visual effect according to the fourth embodiment of the present invention. A distance S6 between the viewing object and the object for visual effect illustrated in FIGS. 19A to 19D is set by the above-mentioned Expression (3) or (4). In Expressions (3) and (4), Y3 is the size of a viewing target image 101a of the viewing object and Y1 is the size of the viewing target image 101a defined by Expression (1). Expressions (3) and (4) indicate the corresponding distance S6 when the size of the viewing target image of the viewing object does not correspond to the actual size of an object image, which is the source of the viewing target image, in a proportional relationship (Expression (1)) with the distance of a viewing recommend position from the viewing object during viewing. More specifically, when the size Y3 of the viewing target image is greater than the ideal size Y1, the distance S6 is increased by Expression (3). In this way, an amount of change in the viewing target image due to motion parallax increases and the viewing target image is perceived to be small. When the size Y3 of the viewing target image is equal to or less than the ideal size Y1, the distance S6 is decreased by Expression (4) and the viewing target image is perceived to be large.

The distance S6 is not uniquely determined due to the human visual characteristics. In this embodiment, it is assumed that the object for visual effect and the viewing object which are separated from each other are seen by peripheral vision (a viewing angle of 10 degrees) and the distance S6 has a width dS which is calculated by Expression (5), with respect to a distance z in a recommended viewing range.

Here, when Y3 which is determined by, for example, the above-mentioned restrictions satisfies Y3>Y1, the distance S6 from the viewing object to the object for visual effect is determined by Expression (3). However, a material 102a for visual effect has a width in the z direction in FIGS. 19A to 19D. Therefore, an amount of change in the object for visual effect due to motion parallax when the viewer moves and sees the viewing target image differs depending on the width. As a result, there is a difference in the perception of the actual size. In contrast, according to this embodiment of the present invention, for the distance S6 determined by the above-mentioned Expression (3), the distance of the object for visual effect is determined as follows.

As illustrated in FIG. 19A, when the distance between the material 102a for visual effect and a viewing object 101 is less than the distance between a viewer 301 and the material 102a for visual effect, the distance S6 between the material 102a for visual effect and the viewing object 101 is set with reference to a surface 702 of the material 102a for visual effect which is closer to the viewing object 101. Here, for simplicity of explanation, the distance is set with reference to the surface 702 of the object for visual effect. However, in practice, as illustrated in FIG. 19A, a reference point is set in a region P1 extending from the surface 702 which is closer to the viewing object 101 to the center of gravity W of the material 102a for visual effect. That is, the distance S6 is a distance from a point in the region P1 to the viewing object 101. Here, the center of gravity W may be, for example, the center of mass of the object for visual effect when the cross-sectional shape of the object for visual effect in the x-z plane does not change in the y direction like the material 201 for visual effect illustrated in FIGS. 2A to 2D. In addition, in a case in which the cross-sectional shape of the object for visual effect in the plane changes like the materials 202 and 203 for visual effect illustrated in FIGS. 2A to 2D, the center of gravity W may be the center of gravity of the x-z plane when the viewer looks straight at the viewing object, that is, when the height y' of the object for visual effect is equal to (the height of the line of sight of the viewer).

As described above, in a case in which the material 102a for visual effect and the viewing object 101 are set at the positions illustrated in FIG. 19A, when the viewer 301 moves in the direction of the negative X-axis while gazing at the surface 703 of the material 102a for visual effect which is closer to the viewer 301, an amount of change in the object for visual effect in the field of view is d4. In contrast, in a case in which the distance S6 is set with reference to the surface 703 of the material 102a for visual effect which is closer to the viewer 301 as illustrated in FIG. 19B, when the viewer 301 moves while gazing at the surface 703 for visual effect, an amount of change in the material 102a for visual effect in the field of view is d5. Here, since the amount of change d5 is less than the amount of change d4, the viewing target image 101a of the viewing object 101 is perceived to be larger than a size equivalent to the actual size as described with reference to FIGS. 5A to 5C. That is, when Y3 is greater than the ideal value Y1, it is not preferable that the viewing target image be perceived to be larger than a size equivalent to the actual size. Therefore, the material 102a for visual effect is set at a position in the region P1 illustrated in FIG. 19A.

As described above, when the distance between the material 102a for visual effect and the viewing object 101 is less than the distance between the viewer 301 and the material 102a for visual effect, the object for visual effect is arranged at a position in the range of the width P1 that is closer to the viewer than the position of the object for visual effect illustrated in FIG. 19A. In this way, the viewer can perceive the viewing target image of the viewing object with a size equivalent to the actual size. Therefore, it is possible to reduce a sense of incongruity for the depth which is perceived by the viewer from the viewing object. In addition, it is possible to reduce a sense of incongruity for the depth which is perceived from the viewing object even at the position of the material 102a for visual effect illustrated in FIG. 19A.

On the other hand, as illustrated in FIG. 19C, when the distance between the material 102a for visual effect and the viewer 301 is less than the distance between the material 102a for visual effect and the viewing object 101, the distance S6 is set with reference to a position in a region P2 extending from the surface 703 of the material 102a for visual effect which is closer to the viewer 301 to the center of gravity W of the material 102a for visual effect. More specifically, first, when Y3 which is determined by, for example, the above-mentioned restrictions satisfies Y3≤Y1, the distance S6 from the viewing object to the object for visual effect is determined by Expression (4). The reference of the distance S6 is determined as follows.

In a case in which the distance between the viewer 301 and the material 102a for visual effect is less than the distance between the viewing object 101 and the material 102a for visual effect, as illustrated in FIG. 19D, if the position of the material 102a for visual effect is determined with reference to the surface 702 of the material 102a for visual effect which is closer to the viewing object 101, an amount of change d5 in the viewing object due to motion parallax is greater than an amount of change d4 when the distance is determined with reference to the surface 703 of the material 102a for visual effect which is closer to the viewer 301. That is, even if the viewer sees the viewing object at the same distance, the viewer perceives the viewing target image of the viewing object to be smaller than a size equivalent to the actual size. As such, when Y3 is less than the ideal value Y1, it is not preferable that the viewing target image be perceived to be smaller than a size equivalent to the actual size. For this reason, the distance S6 is determined with reference to a position in the range of the width P2 illustrated in FIG. 19C. Therefore, it is possible to reduce a sense of incongruity for the depth which is perceived by the viewer from the viewing object.

Modification Example of Fourth Embodiment

A display set according to a modification example of the fourth embodiment is the same as that according to the third modification example illustrated in FIGS. 17A to 17D.

Next, explanation will be made for how to arrange a material 804 for visual effect with respect to the distance to a viewer 801 and to a viewing object 802 in the display set according to this modification example, in detail with reference to FIGS. 20A to 20D. FIGS. 20A to 20D are diagrams explaining a method for arranging the object for visual effect according to this modification example.

Figure 20A:
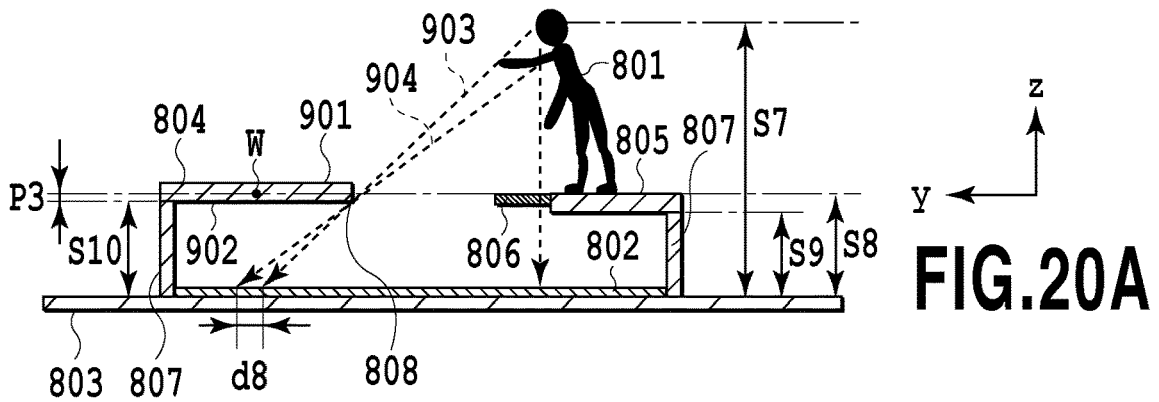
FIGS. 20A to 20D are diagrams illustrating methods for arranging an object for visual effect according to a modification example of the fourth embodiment.
Figure 20B:
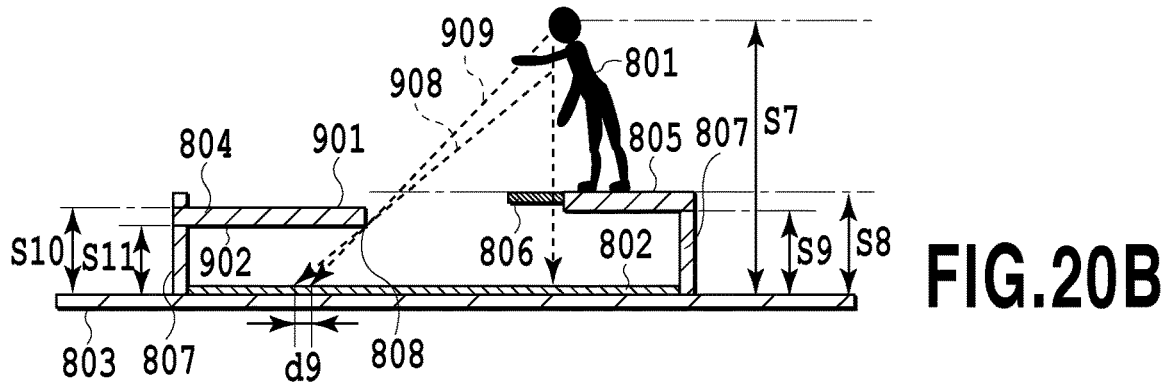

In modification example, as illustrated in FIG. 20A, in particular, in the case that the distance between materials 804 to 807 for visual effect and a viewing object 802 is short, a distance S10 between the material 804 for visual effect and the viewing object 802 is set with reference to a position in a region P3 extending from a surface 902, which is closer to the viewing object 802, to the center of gravity W of the object for visual effect, in the material 804 for visual effect which is different from the material 805 for visual effect and which a viewer 801 comes into contact with (is present in). As such, in a case in which the material 804 for visual effect and the viewing object 802 are set at the positions illustrated in FIG. 20A, when the viewer 801 moves in the direction of the negative z-axis (line of sight 904) while gazing at an end 808 of the surface 902 of the material 804 for visual effect which is closer to the viewing object 802 (line of sight 903), an amount of change in the object for visual effect in a field of view is d8. In contrast, in a case in which the distance is set with reference to a surface 901 of the material 804 for visual effect which is closer to the viewer 801 as illustrated in FIG. 20B, when the viewer 801 moves in the direction of the negative z-axis (line of sight 909) while gazing at the end 808 of the surface 902 of the material 804 for visual effect which is closer to the viewing object 802 (line of sight 909), an amount of change in the object for visual effect in the field of view is d9. Here, since the variation d9 is less than the variation d8, a viewing target image of the viewing object 802 is perceived to be larger than a size equivalent to the actual size as described with reference to FIGS. 5A to 5C. As such, when the viewer 801 sees the viewing target image at a recommend viewing distance Z (=S7), the reference of the distance of the object for visual effect is arranged at a position that is closer to the viewer than the position of the object for visual effect illustrated in FIG. 20A. Therefore, it is possible to prevent the viewing target image from being perceived to be large and to easily perceive a size equivalent to the actual size. As a result, a sense of incongruity for the perception height of the viewer from the viewing object is reduced. However, even when the distance between the material 805 for visual effect and the viewing object 802 is short as illustrated in FIG. 20A, the distance is appropriately set at a position on one surface of the material 804 for visual effect described in this modification example. When the material 805 for visual effect on which the viewer 801 stands and the material 804 for visual effect which causes motion parallax are the same member, the material 804 for visual effect is set at a position that is higher than the material 805 for visual effect as illustrated in FIG. 20A. In this way, it is possible to reduce a sense of incongruity for the depth that is perceived from the viewing object.

In this modification example, a sense of height (=depth) in the Z-axis direction is further improved. As illustrated in FIG. 20A, the material 804 for visual effect is set at a position that is higher than the material 805 for visual effect and the thickness of the material 805 for visual effect is reduced. Therefore, it is possible to provide a display set in which the distance S10 from the viewing object 802 to the material 804 for visual effect increases and the height that is perceived increases.

Figure 20C:
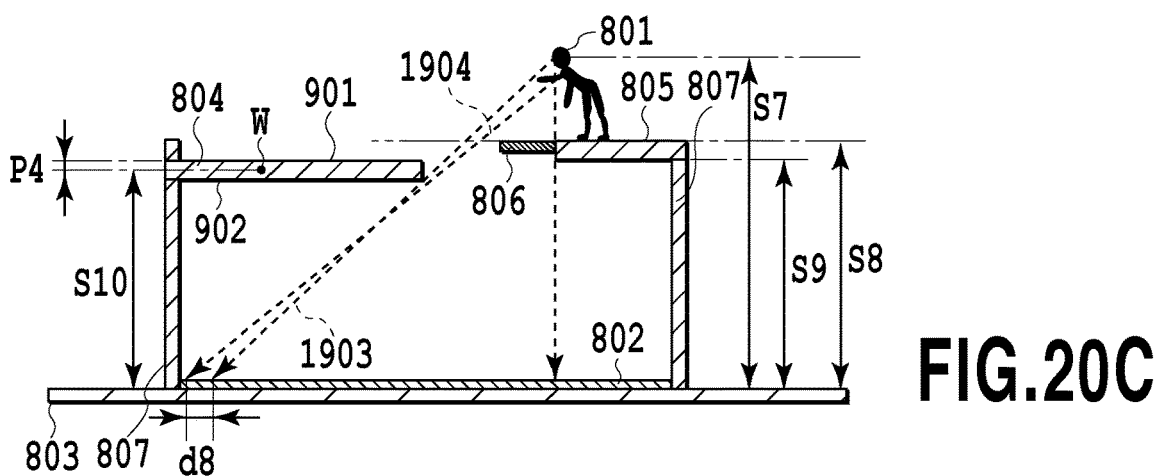
Figure 20D:
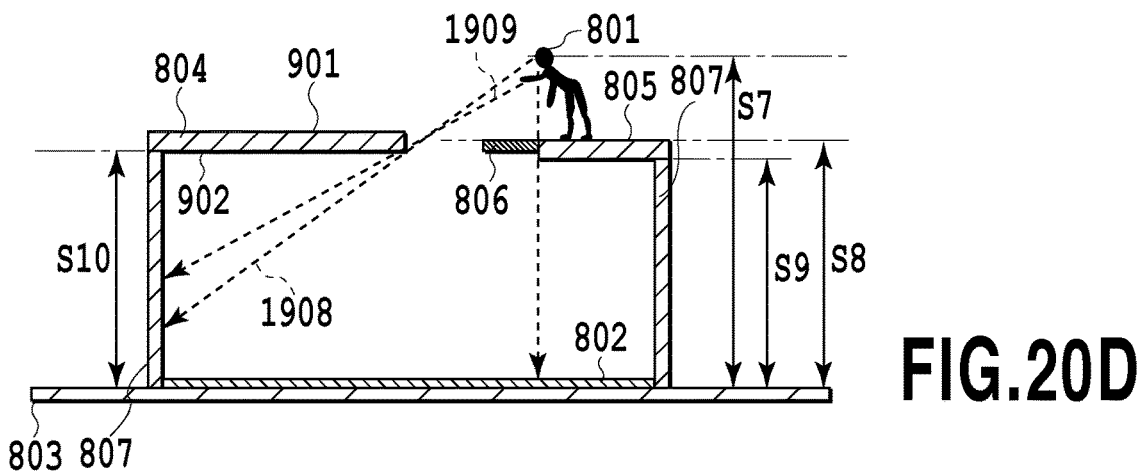

As illustrated in FIG. 20C, when the material 804 for visual effect is closer to the viewer 801 than to the viewing object 802, the distance is set with reference to a position in a region P4 extending from the surface 901 of the material 804 for visual effect which is closer to the viewer 801 to the center of gravity W of the object for visual effect. If the position of the material 804 for visual effect is set with reference to the surface 902 of the material 804 for visual effect which is closer to the viewing object 802 as illustrated in FIG. 20D, an amount of change caused by motion parallax is more than that in the case illustrated in FIG. 20C. As a result, the viewing object is perceived to be smaller than a size equivalent to the actual size and a difference in depth occurs.

As described above, the object for visual effect according to this modification example has the effect of enabling a person to supplement human empirical cues to perceive depth or a sense of three-dimension and improving "a sense of reality" of the viewing object, such as a sense of three-dimension or a sense of immersion.

Fifth Embodiment

A fifth embodiment of the present invention relates to an arrangement in which the relationship between the line of sight of the viewer and an eye level line, which is the height of a vanishing point of a viewing object, in the viewing conditions that have been described with reference to FIG. 3 is appropriately controlled.

Figure 21:
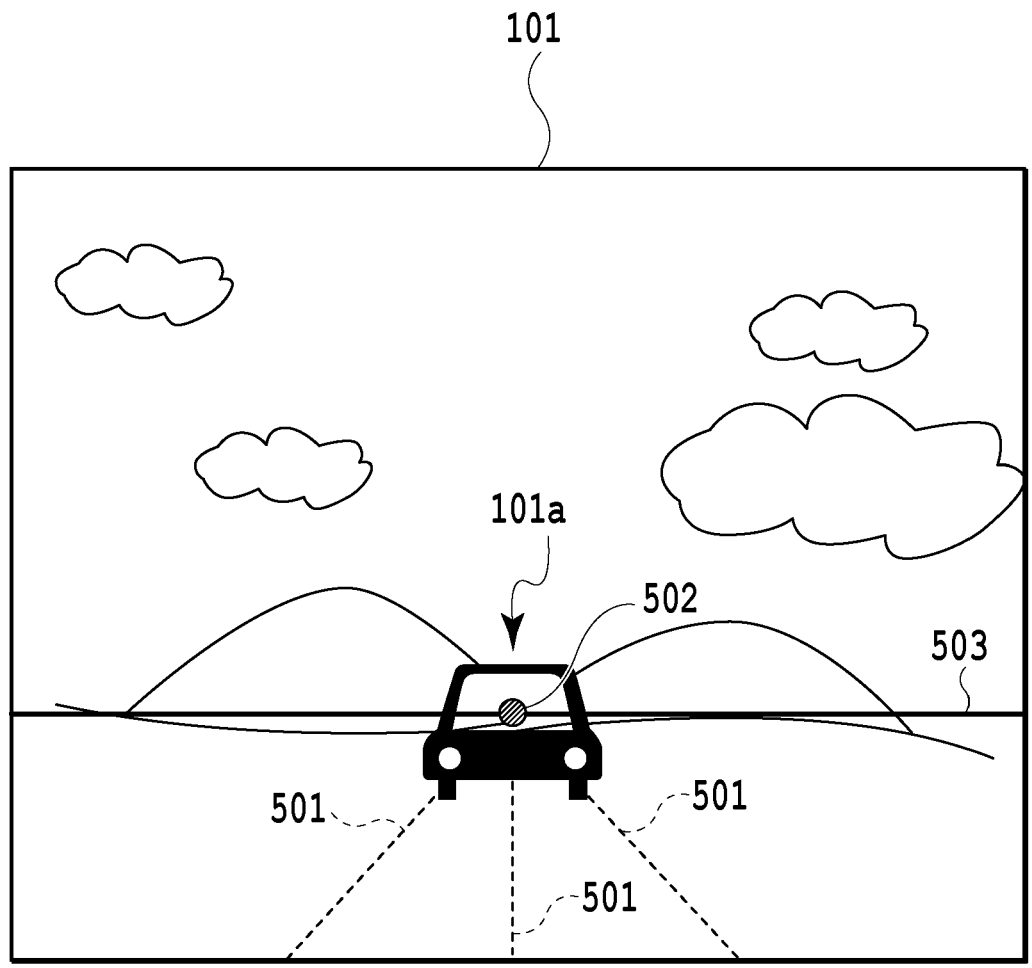
FIG. 21 is a diagram illustrating the relationship between a line of sight of a viewer and an eye level line indicating the height of a vanishing point of a viewing object in a fifth embodiment of the invention.

FIG. 21 is a diagram illustrating the relationship between the line of sight of the viewer and the eye level line which is the height of the vanishing point of the viewing object in the fifth embodiment of the invention. In FIG. 21, a dashed line 501 indicates a line which is an element of perspective in an image of a viewing object 101. The dashed line 501 is not present in the actual viewing object, is an element of perspective, and is a virtual line along a road 101e. The perspective is a technique for representing a three-dimensional space in two dimensions with depth. In practice, lines along both ends of the road or a dashed line passing through the center of the road, which are represented by the dashed lines 501 in FIG. 21, are parallel lines. When the lines are represented in a two-dimensional space, they are converged on a vanishing point 502 illustrated in FIG. 21. When the gap between segments relates to the width, depth (the width of the road in FIG. 21), or height of an object is gradually reduced, the viewer perceives and recognizes a distance in the depth direction. In FIG. 21, there is one vanishing point. However, when there are a plurality of parallel lines with different angles in the field of view, a plurality of vanishing points are present. A segment indicating the height of the vanishing point is an eye level line 503.

Figure 22A:
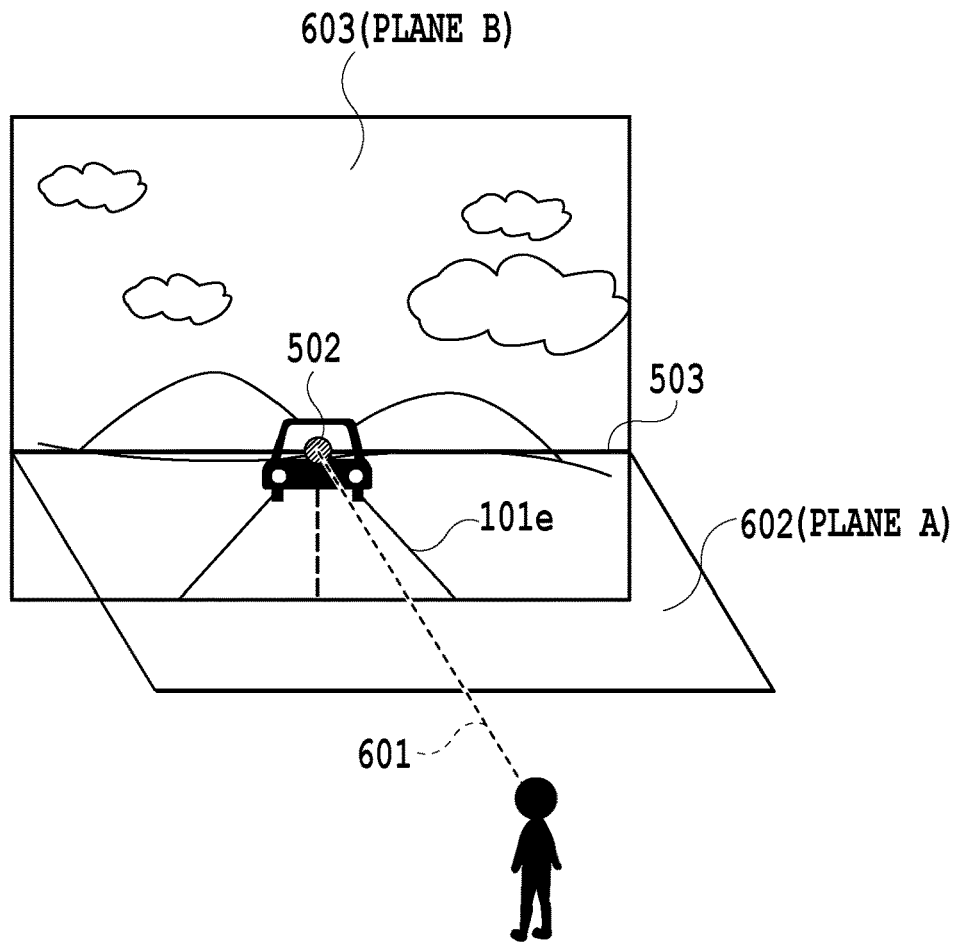
FIGS. 22A and 22B are diagrams illustrating the relationship between the line of sight of the viewer and the eye level line of the viewing object in the fifth embodiment.
Figure 22B:
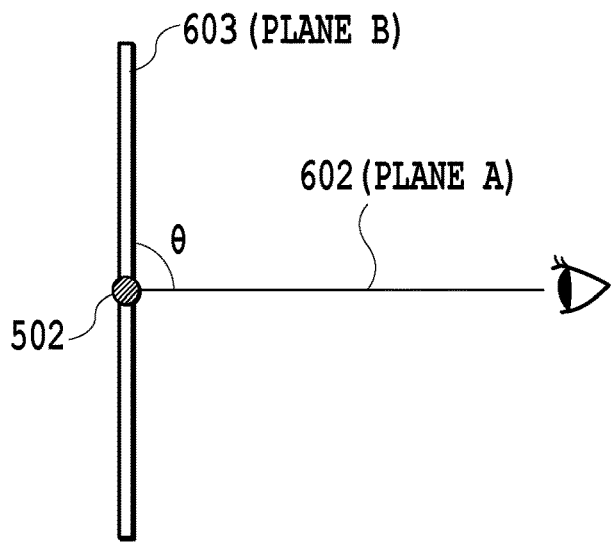

FIGS. 22A and 22B are diagrams explaining the relationship between the line of sight of the viewer and the eye level line 503 of the viewing object 101. FIG. 22A is a diagram illustrating the relationship among the viewing object, the line of sight, and planes A and B, which will be described below. FIG. 22B is a diagram illustrating the range of central vision described later when the viewing object is seen from the side.

Figure 23A:
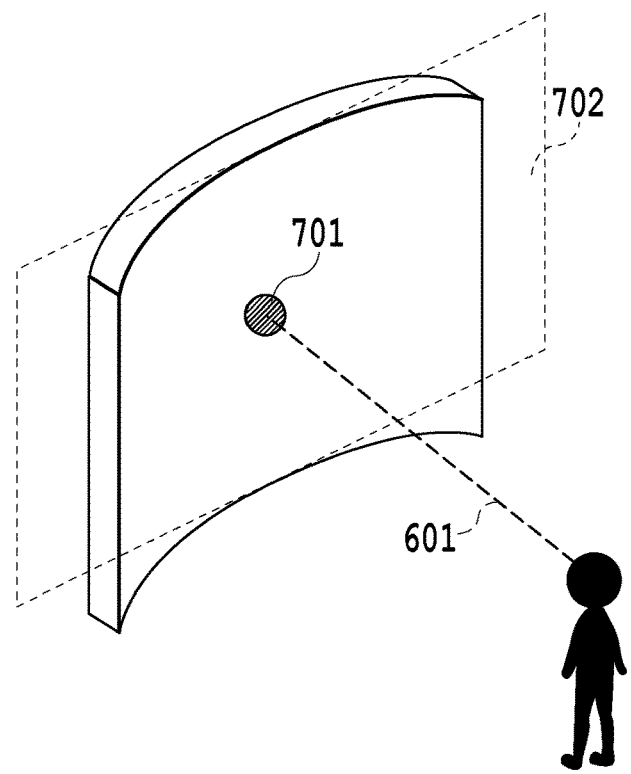
FIGS. 23A and 23B are diagrams illustrating examples in which the viewing object according to the embodiment of the invention has a curved surface and a spherical surface.
Figure 23B:
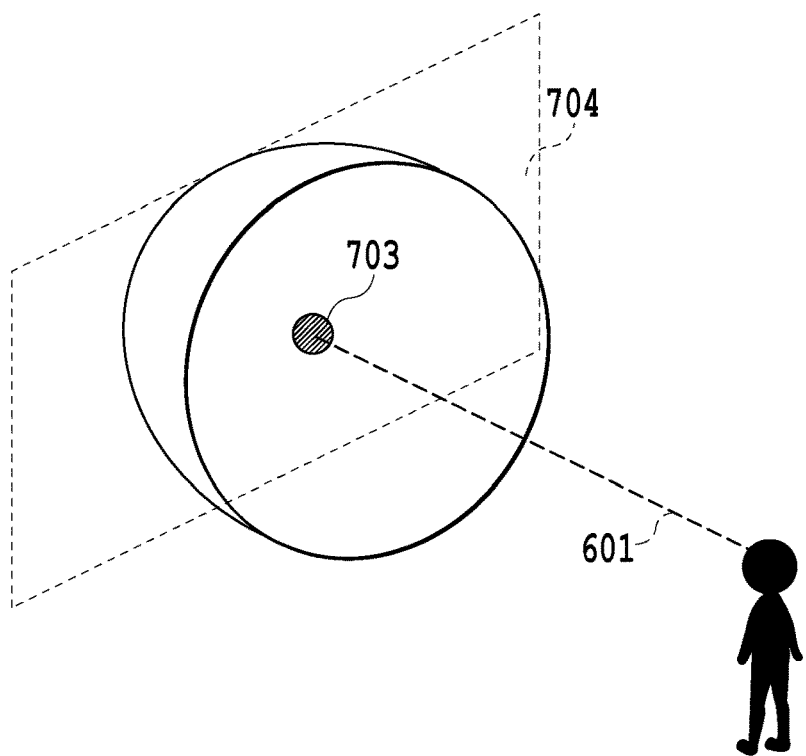

In this embodiment, the line of sight of the viewer is a line that connects the center of the eye of the viewer and a viewing target, as represented by reference numeral 601 in FIG. 22A. As illustrated in FIG. 22A, the eye level line 503 of the viewing object intersects the line of sight 601 when the viewer gazes at an arbitrary point (the vanishing point 502 in FIGS. 22A and 22B on the eye level line. A plane including the line of sight 601 and the eye level line 503 is referred to as the plane A (602) and a plane that intersects the plane A and includes the eye level line 503 is referred to as the plane B. In this embodiment, the plane B is the plane of the viewing object 101 in FIGS. 22A and 22B. As illustrated in FIGS. 23A and 23B, in a case in which the viewing object has a curved surface (FIG. 23A) or a spherical surface (FIG. 23B), when intersection points between the line of sight 601 and the eye level line on the surfaces of the viewing object are 701 and 703, the plane B are planes 702 and 704 which are tangent to the viewing object at the intersection points 701 and 703, respectively. In this embodiment, as illustrated in FIG. 22B, an angle θ formed between the plane A and the plane B is in a range of equal to or greater than 89° and of equal to or less than 91°. The reason is that the viewing angle of the central vision, which is a region in which color discrimination capability and visual acuity are the highest, is 2° and the eye level line can be checked in the range of the central vision, which makes it possible for the viewer to appropriately estimate the distance to the viewing target image of the viewing object.

As such, when control is performed such that the above-mentioned relationship between the line of sight of the viewer and the eye level line of the viewing object is established, it is possible to effectively express perceptive depth which is empirically estimated from information about the viewing object, for example, the size of the viewing target image or a component of perspective and perceptive depth which is obtained from motion parallax generated from the viewing object and the object for visual effect when the viewer moves. In addition, since a distance that is perceived from the physical distance between the viewing object and the object for visual effect is added, the viewer can appropriately estimate the distance to the viewing target image of the viewing object and a sense of distance in which the viewing target image of the viewing object is perceived as the actual object can be generated. In this embodiment, as illustrated in FIGS. 22A and 22B, the plane A and the plane B are perpendicular to each other (90°). In this state, perceptive depth is most effectively expressed.

Figure 24A:
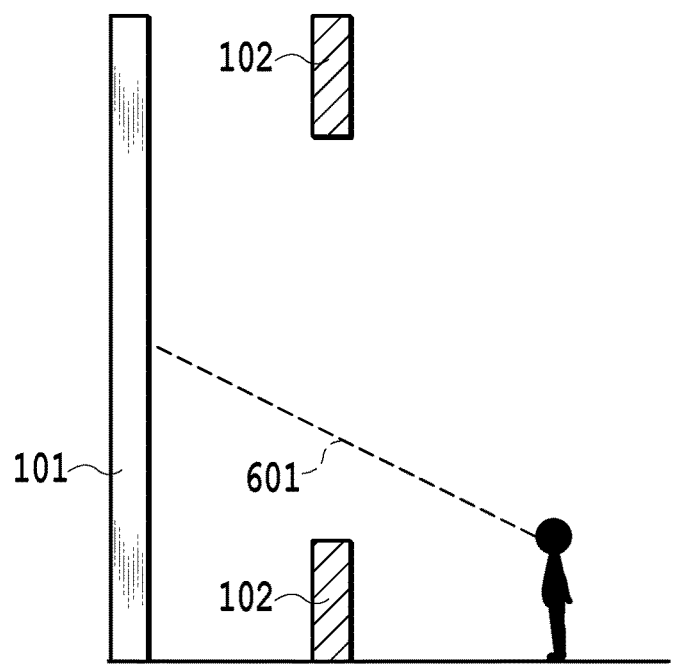
FIGS. 24A and 24B are diagrams illustrating examples of a case in which the viewer looks up at the viewing object according to the fifth embodiment of the invention and a case in which the viewer looks down at the viewing object.
Figure 24B:
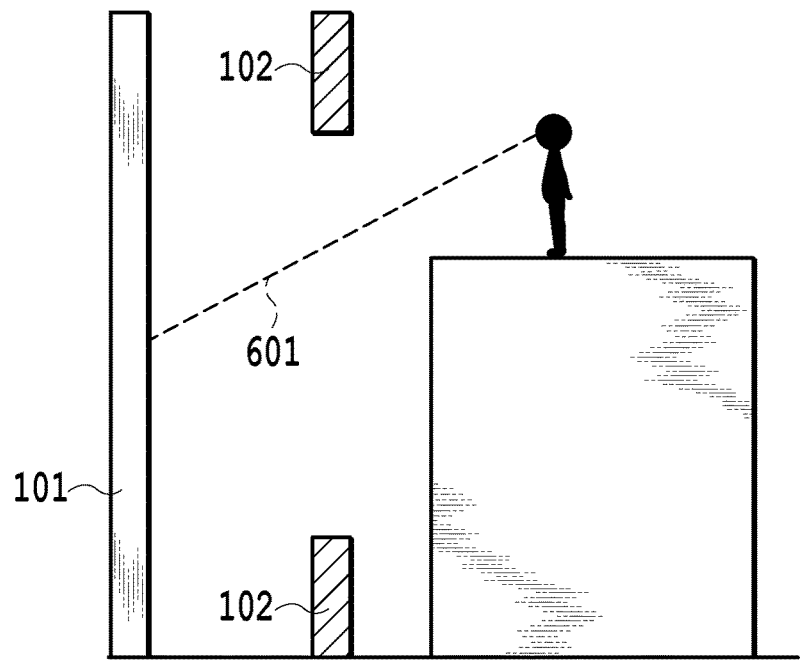

As illustrated in FIGS. 24A and 24B, when the above-described state is not established, for example, when the viewer looks up at the viewing object 101 (FIG. 24A) or when the viewer looks down at the viewing object 101 (FIG. 24B), the image of the viewing object 101 looks distorted. Therefore, the dashed line 501 forming the perspective for providing a sense of depth is also distorted and sensory distortion occurs in the perspective depth obtained from motion parallax in addition to the distance perceived from information about the viewing object. As a result, it is difficult for the viewer to perceive an appropriate distance and to feel a sense of distance in which the viewing target image of the viewing object is perceived as the actual object, which results in a reduction in a sense of reality of the display set.

Modification Example of Fifth Embodiment

A display set according to a modification example of the fifth embodiment differs from the display set according to the fifth embodiment in that the position of the viewer is higher than the position where the viewing object is installed and looks down at the viewing object. In this embodiment, the relationship between the line of sight of the viewer and the eye level line of the viewing object is appropriately controlled in order to provide a sense of distance in the height direction.

Figure 25B:
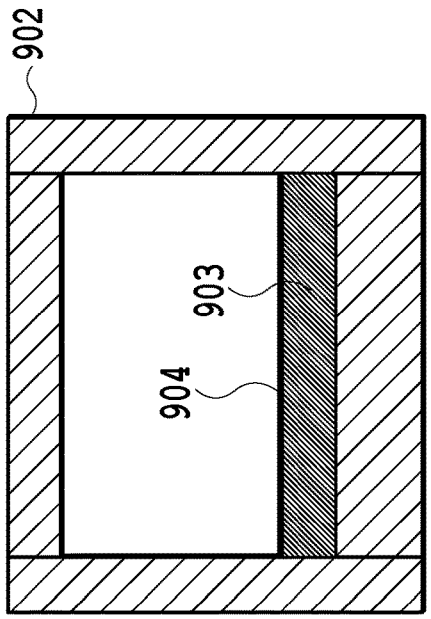
FIGS. 25A to 25D are diagrams illustrating the upper surfaces of a viewing object and an object for visual effect and the side and upper surfaces of a display set according to a modification example of the fifth embodiment.
Figure 25D:
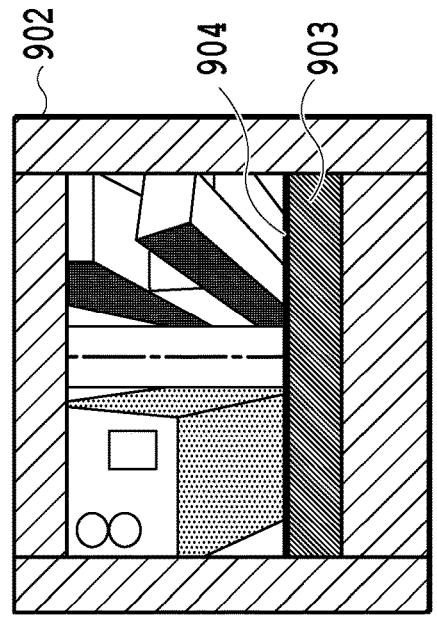
Figure 25A:
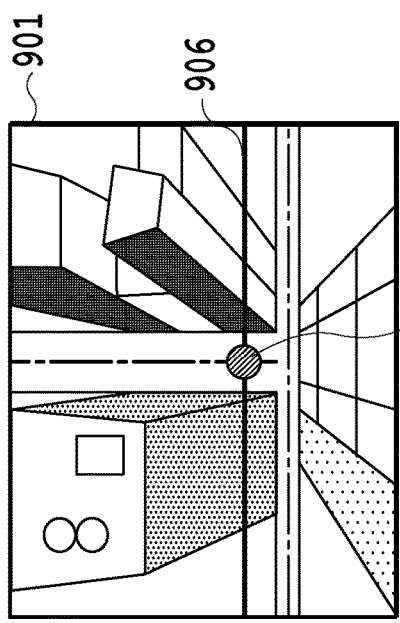
Figure 25C:
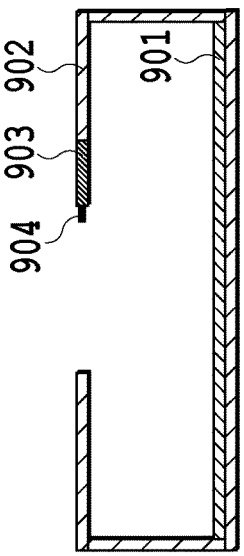

FIGS. 25A to 25D are diagrams illustrating the display set according to this modification example. FIG. 25A illustrates a viewing object 901. In the viewing object, reference numeral 905 indicates a vanishing point and reference numeral 906 indicates an eye level line. The viewing object 901 is, for example, a picture of scene which is taken from the top of a building and is preferably an image which is captured at a position that is higher than the ground, such as the top of the building, in addition to the ground. FIG. 25B illustrates a material 902 for visual effect. A material 903 for visual effect which is a portion of the material 902 for visual effect is made of transparent glass and the viewer can walk on the material 903 for visual effect. A black frame is provided at the upper end 904 of a glass portion in order to generate motion parallax during viewing. FIG. 25C is a side view illustrating the display set. The viewing object 901 is attached to the bottom of the material 902 for visual effect with the top up. FIG. 25D is a top view illustrating the display set. Conditions, such as the distance between the viewing object and the object for visual effect and a condition in which the object for visual effect conceals a portion of the viewing object when the viewer sees the viewing object at a viewing position, are the same as those in the fifth embodiment.

Figure 26:
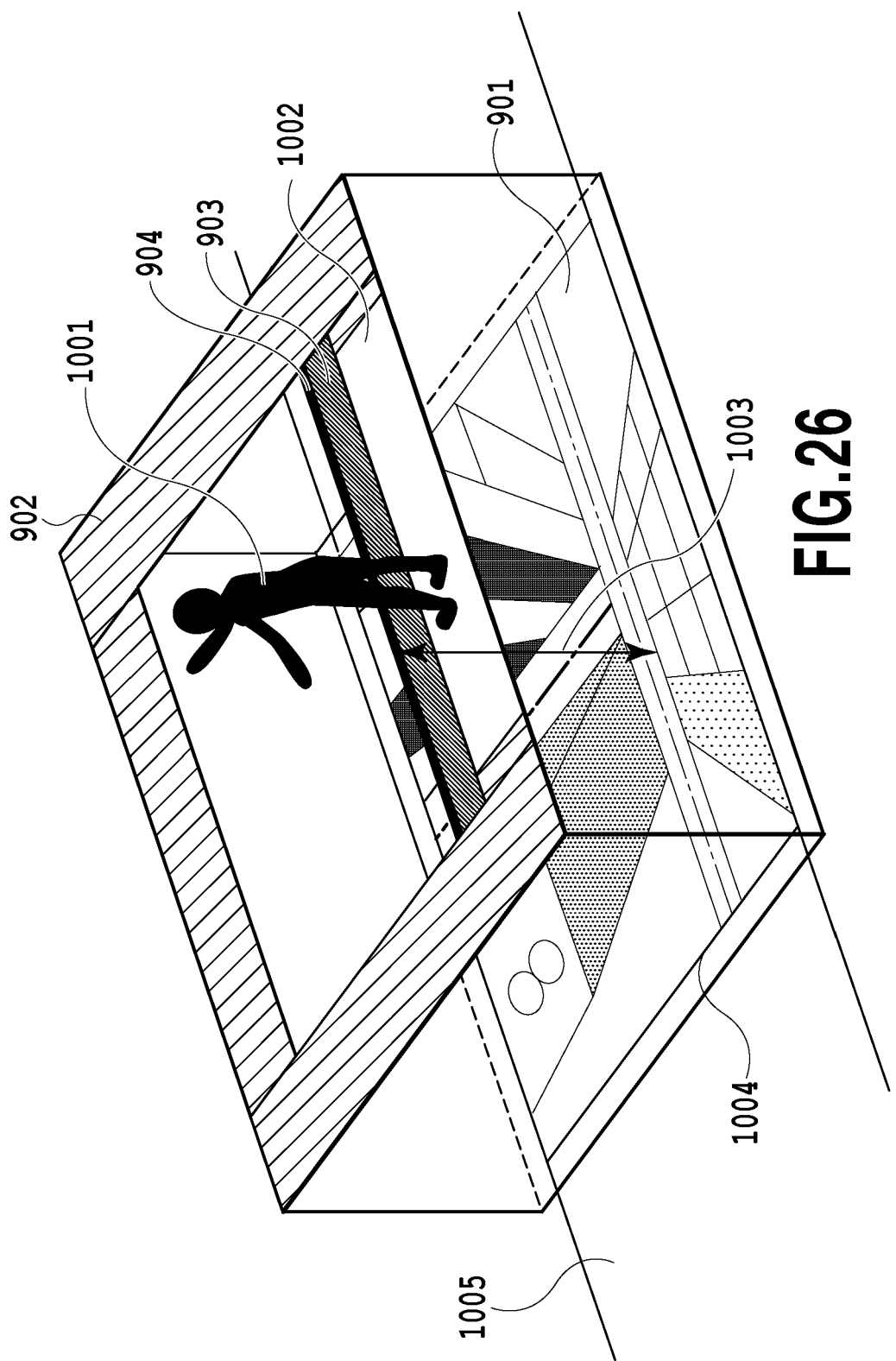
FIG. 26 is a diagram illustrating the relationship among the viewing object, the object for visual effect, and the viewer during viewing in the modification example of the fifth embodiment.

FIG. 26 is a diagram illustrating the relationship among the viewing object 901, the material 902 for visual effect, and a viewer 1001 during viewing in this modification example. The viewer 1001 sees the viewing object at a position in a recommended viewing range 1002 on the upper surface of the object for visual effect which is set at a predetermined height from the viewing object. The shortest distance 1003 between the viewing object 901 and the viewer 1001 is set to a distance that is more than 2 meters at which depth can be recognized by a focus adjustment function of the human eye. The reason is the same as that in the fifth embodiment. The shortest distance 1003 between the viewing object and the viewer is set to a distance so that while the viewer gazes at the viewing object, ends 1004 of a long side of the viewing object 901 is in the range of the field of view in a direction that is parallel to the long side, in the recommended viewing range. The recommended viewing range is set for the same reason as that in the fifth embodiment. Therefore, a boundary 1005 between the viewing object and a display surface is not seen and a reduction in a sense of reality is prevented. Motion parallax and a shielding effect for obtaining a sense of reality are the same as those in the fifth embodiment.

Figure 27A:
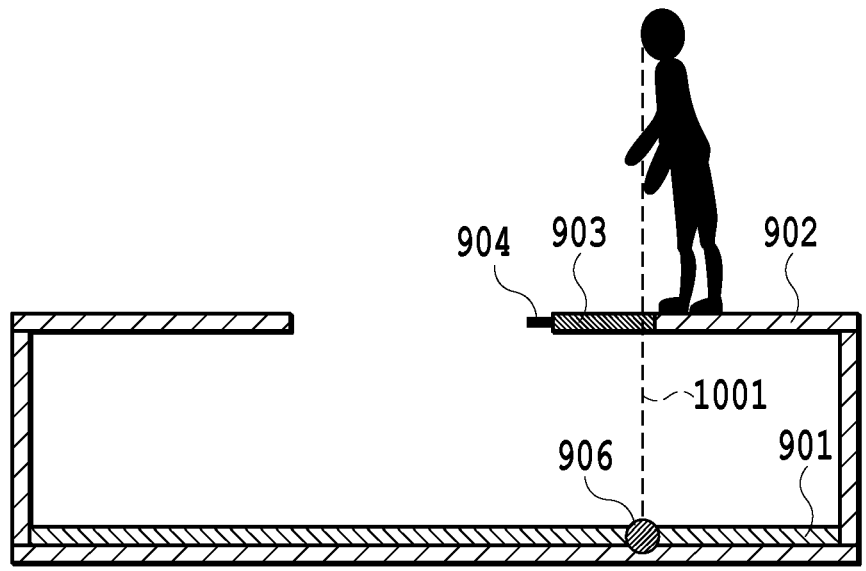
FIGS. 27A and 27B are diagrams illustrating examples of an inclination angle between a plane which is perpendicular to the line of sight of the viewer and includes a contact point between the line of sight and an eye level line and an installation surface of the viewing object in the modification example of the fifth embodiment.

In this modification example, as illustrated in FIG. 27A, the viewer sees the viewing object such that the line of sight 1001 of the viewer is aligned with the vertical direction. In this case, similarly to the fifth embodiment, an angle formed between a plane A including the line of sight 1001 and an eye level line 906 and a plane which intersects the plane A and includes an eye level line is equal to or greater than 89° and equal to or less than 91°. In this modification example, similarly to the fifth embodiment, the plane A and the plane B are perpendicular to each other (90°). In this state, perceptive depth is most effectively expressed.

The relationship between the line of sight of the viewer and the eye level line of the viewing object is controlled so as to be the same as the above-mentioned relationship, similarly to the fifth embodiment, and the line of sight of the viewer is aligned with the vertical direction. In this direction, the viewer empirically feels the greatest sense of height as a sense of distance. Therefore, it is possible to effectively give a perceptive sense of height which is empirically estimated from information about the viewing object and a perceptive sense of height which is obtained from motion parallax generated by the viewing object and the object for visual effect when the viewer moves. In addition, since the distance which is perceived from the physical distance between the viewing object and the object for visual effect is added, the viewer can appropriately estimate the distance to the viewing target image of the viewing object in the height direction and a sense of distance in which the viewing target image of the viewing object is perceived as the actual object is provided.

Figure 27B:
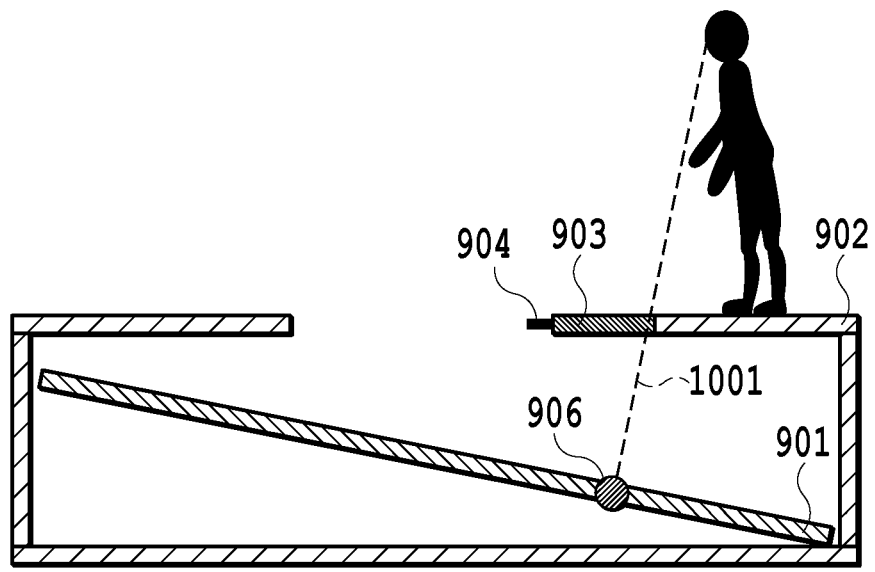

As illustrated in FIG. 27B, in a display set in which a viewing position is behind the position illustrated in FIG. 27A due to restrictions and it is difficult for the viewer to see the viewing object in the vertical direction, an inclination angle between a surface on which the viewing object is installed (the bottom of the object for visual effect) and the plane B is large and a sense of distance in the height direction is reduced. However, when the relationship between the line of sight of the viewer and the eye level line of the viewing object is optimal as in the present invention, it is possible to maximize a sense of distance in the height direction.

As illustrated in FIGS. 23A and 23B in the fifth embodiment, even if the viewing object has a curved surface or a spherical surface, this modification example can provide a sense of distance from an object of the viewing object in the height direction to the viewer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-152886, No. 2015-152778, No. 2015-152926, No. 2015-152933, and No. 2015-152936, filed Jul. 31, 2015, which are hereby incorporated by reference wherein in their entirety.

What is claimed is:
1. A display set comprising:
a viewing object;
an object for visual effect that is arranged on a viewing position side with respect to the viewing object and at a distance from the viewing object and that shields at least a portion of the viewing object, the viewing object and the object for visual effect being respectively fixed so that the relative position between the viewing object and the object for visual effect does not change; and
a guide path display that indicates a recommended viewing position for viewing the viewing object, to guide the viewer to the recommended viewing position,
wherein the object for visual effect is between the viewing object and the recommended viewing position,
wherein the recommended viewing position is equal to or longer than 2 meters from the viewing object, and
wherein both ends of the viewing object in a horizontal direction are not within an angle of 120 degrees corresponding to a viewing angle in a case of gazing at the center of the viewing object from the recommended viewing position.

2. The display set according to claim 1, wherein when a distance of the recommended viewing position from the viewing object is Z1, a size of a viewing target image of the viewing object is Y1, a distance between an imaging device and an actual viewing target image when the imaging device takes a picture of the viewing object is Z2, and a size of the actual viewing target image is Y2, the recommended viewing position is set on the basis of the distance from the viewing object to the recommended viewing position such that a following formula is satisfied, $$Z1 \geq (Z2 \times Y1)/Y2.$$

3. The display set according to claim 1, wherein the object for visual effect is arranged to shield a boundary between (a) a display surface to which the viewing object is attached and (b) the viewing object.

4. The display set according to claim 1, wherein a distance between the viewing object and the object for visual effect is determined based on a size of the viewing object in a horizontal direction so that the object for visual effect shields a boundary between (a) a display surface to which the viewing object is attached and (b) the viewing object.

5. The display set according to claim 1, wherein a brightness relationship between at least a portion of the viewing object and at least a portion of the object for visual effect is determined according to a brightness of one of at least the portion of the viewing object and at least the portion of the object for visual effect.

6. The display set according to claim 5, wherein in a case where the brightness of at least the portion of the viewing object is lighter than a predetermined brightness, the brightness of at least the portion of the object for visual effect is determined to be darker than that of the brightness of at least the portion of the viewing object.

7. The display set according to claim 6, wherein in a case where the brightness of at least the portion of the viewing object is lighter than a predetermined brightness, an average value of the brightness of at least the portion of the object for visual effect is determined to be a brightness that is equal to or darker than an average value of the brightness of at least the portion of the viewing object.

8. The display set according to claim 7, wherein a case that the brightness of at least the portion of the viewing object is lighter than the predetermined brightness corresponds to a case that the average value of the brightness of at least the portion of the viewing object is equal to or greater than a median value of an upper limit of a brightness value from an original image and a lower limit of the brightness value from the original image defined in at least the portion of the viewing object.

9. The display set according to claim 7, wherein a case that the brightness of at least the portion of the viewing object is lighter than the predetermined brightness corresponds to a case that when a difference between an upper limit of a brightness defined in at least the portion of the viewing object and the average value of the brightness of at least the portion of the viewing object is a difference A and a difference between a lower limit of a brightness defined in at least the portion of the viewing object and the average value of the brightness of at least the portion of the viewing object is a difference B, the difference A is more than the difference B.

10. The display set according to claim 5, wherein in a case where the brightness of at least the portion of the viewing object is darker than a predetermined brightness, the brightness of at least the portion of the object for visual effect is determined to be lighter than that of the brightness of at least the portion of the viewing object.

11. The display set according to claim 10, wherein in a case where the brightness of at least the portion of the viewing object is darker than a predetermined brightness, an average value of the brightness of at least the portion of the object for visual effect is determined to be a brightness that is equal to or lighter than an average value of the brightness of at least the portion of the viewing object.

12. The display set according to claim 11, wherein a case that the brightness of at least the portion of the viewing object is darker than the predetermined brightness corresponds to a case that the average value of the brightness of at least the portion of the viewing object is smaller than a median value of an upper limit of a brightness value from an original image and a lower limit of the brightness value from the original image defined in at least the portion of the viewing object.

13. The display set according to claim 11, wherein a case that the brightness of at least the portion of the viewing object is darker than the predetermined brightness corresponds to a case that when a difference between an upper limit of a brightness defined in at least the portion of the viewing object and the average value of the brightness of at least the portion of the viewing object is a difference A and a difference between a lower limit of a brightness defined in at least the portion of the viewing object and the average value of the brightness of at least the portion of the viewing object is a difference B, the difference A is less than the difference B.

14. The display set according to claim 5, wherein the brightness of at least the portion of the viewing object and at least the portion of the object for visual effect is capable of being adjusted by a light.

15. The display set according to claim 1, wherein in a case where the object for visual effect is closer to the recommended viewing position, a distance between the viewing object and the object for visual effect is set with reference to a position between a center of gravity of the object for visual effect and an end of the object for visual effect which is closer to the viewing object in a viewing direction, and
wherein in a case where the object for visual effect is closer to the viewing object, a distance between the viewing object and the object for visual effect is set with reference to a position between a center of gravity of the object for visual effect and an end of the object for visual effect which is closer to the recommended viewing position in the viewing direction.

16. The display set according to claim 1, wherein in a case where the object for visual effect is closer to the recommended viewing position, a distance between the viewing object and the object for visual effect is set with reference to a position between a center of gravity of the object for visual effect and an end of the object for visual effect which is closer to the recommended viewing position in a viewing direction, and
wherein in a case where the object for visual effect is closer to the viewing object, a distance between the viewing object and the object for visual effect is set with reference to a position between the center of gravity of the object for visual effect and an end of the object for visual effect which is closer to the viewing object in the viewing direction.

17. The display set according to claim 1, wherein the display set is a display set in which a position of the object for visual effect shielding the viewing object changes in the viewer's field of view with respect to the viewing object, when a viewing position of the viewer moves while the viewer gazes at the object for visual effect,
wherein an eye level line defining a height of a vanishing point defined in a viewing target image in the viewing object and a line of sight of the viewer intersect with each other, and
wherein when a plane including the line of sight and the eye level line is referred to as a plane A and a plane that intersects the plane A and includes the eye level line is referred to as a plane B, an angle formed between the plane A and the plane B is in a range of equal to or greater than 89° and of equal to or less than 91°.

18. A display set comprising:
a viewing object;
an object for visual effect that is arranged on a viewing position side with respect to the viewing object and that shields at least a portion of the viewing object, the viewing object and the object for visual effect being respectively fixed so that the relative position between the viewing object and the object for visual effect does not change;
a guide path display that indicates a recommended viewpoint for viewing the viewing object,
wherein when a distance of the recommended viewpoint from the viewing object is Z1, a size of a viewing target image of the viewing object is Y1, a distance between an imaging device and an actual viewing target image when the imaging device takes a picture of the viewing object is Z2, and a size of the actual viewing target image is Y2, the recommended viewpoint is set on the basis of the distance from the viewing object to the recommended viewpoint such that a following formula is satisfied, $$Z1 \geq (Z2 \times Y1)/Y2.$$

19. A display set comprising:
a viewing object;
an object for visual effect that is arranged on a viewing position side with respect to the viewing object and that shields at least a portion of the viewing object, the viewing object and the object for visual effect being respectively fixed so that the relative position between the viewing object and the object for visual effect does not change;
a guide path display that indicates a recommended viewpoint for viewing the viewing object,
wherein a distance between the viewing object and the recommended viewpoint is equal to or longer than 2 meters.

20. A display set comprising:
a viewing object;
an object for visual effect that is arranged on a viewing position side with respect to the viewing object and that shields at least a portion of the viewing object, the viewing object and the object for visual effect being respectively fixed so that the relative position between the viewing object and the object for visual effect does not change;

a guide path display that indicates a recommended viewpoint for viewing the viewing object, wherein boundaries between (a) a display surface to which the viewing object is attached and (b) the viewing object in a horizontal direction are within a range of a field of view of a viewer at the recommended viewpoint in a case where the viewer gazes at a center of the viewing object.

21. The display set according to claim 20, wherein the object for visual effect is arranged to shield the boundary between (a) the display surface to which the viewing object is attached and (b) the viewing object.

22. The display set according to claim 21, wherein a distance between the viewing object and the recommended viewpoint is equal to or longer than 2 meters.

23. A display set comprising:

a viewing object;

an object for visual effect that is arranged on a viewing position side with respect to the viewing object and that shields at least a portion of the viewing object, the viewing object and the object for visual effect being respectively fixed so that the relative position between the viewing object and the object for visual effect does not change;

a guide path display that indicates a recommended viewpoint for viewing the viewing object, wherein a distance between the viewing object and the object for visual effect is determined based on a size of the viewing object in a horizontal direction so that the object for visual effect shields a boundary between (a) a display surface to which the viewing object is attached and (b) the viewing object.

\* \* \* \* \*